US011455654B2

(12) United States Patent
Brown et al.

(10) Patent No.: US 11,455,654 B2
(45) Date of Patent: Sep. 27, 2022

(54) METHODS AND SYSTEMS FOR DETERMINING PROVENANCE AND IDENTITY OF DIGITAL ADVERTISING REQUESTS SOLICITED BY PUBLISHERS AND INTERMEDIARIES REPRESENTING PUBLISHERS

(71) Applicant: Madhive, Inc., New York, NY (US)

(72) Inventors: Aaron Brown, New York, NY (US); Tom Bollich, New York, NY (US); Adam Helfgott, New York, NY (US)

(*) Notice: Subject to any disclaimer, the term of this patent is extended or adjusted under 35 U.S.C. 154(b) by 6 days.

(21) Appl. No.: 17/393,549

(22) Filed: Aug. 4, 2021

(65) Prior Publication Data

US 2022/0044279 A1 Feb. 10, 2022

Related U.S. Application Data

(60) Provisional application No. 63/061,602, filed on Aug. 5, 2020.

(51) Int. Cl.
*G06Q 30/02* (2012.01)
*G06N 3/08* (2006.01)

(52) U.S. Cl.
CPC ........... *G06Q 30/0248* (2013.01); *G06N 3/08* (2013.01); *G06Q 30/0264* (2013.01)

(58) Field of Classification Search
CPC .................................................. G06Q 30/0248
USPC ...................................................... 705/14.47
See application file for complete search history.

(56) References Cited

U.S. PATENT DOCUMENTS

| 5,161,204 | A * | 11/1992 | Hutcheson | ............... G07C 9/25 708/821 |
| 10,885,523 | B1 * | 1/2021 | Luttrell | .............. G06Q 20/3674 |
| 10,949,269 | B1 * | 3/2021 | Wang | .................. H04L 63/1425 |
| 2012/0221386 | A1 | 8/2012 | Netzer et al. | |
| 2014/0100970 | A1 | 4/2014 | Netzer et al. | |
| 2014/0189498 | A1 | 7/2014 | Liverant et al. | |
| 2014/0278981 | A1 | 9/2014 | Mersov et al. | |
| 2015/0278852 | A1 | 10/2015 | McLaughlin et al. | |
| 2015/0278853 | A1 | 10/2015 | McLaughlin et al. | |

(Continued)

OTHER PUBLICATIONS

Briley, Roger W., An Introduction to Vectors and Tensors from a Computational Perspective, dated May 2013, downloaded from https://www.utc.edu/sites/default/files/2020-06/utc-cecs-simcenter-2013-01.pdf (hereinafter, Briley) on Oct. 16, 2021 (Year: 2013).*

(Continued)

*Primary Examiner* — Scott D Gartland
(74) *Attorney, Agent, or Firm* — Derek Fahey, Esq.; The IP Plus Firm, PLLC

(57) ABSTRACT

Described is a computer implemented method for determining provenance and identity of a digital advertising request for an advertisement solicited by at least one of a publisher and an intermediary representing the publisher. The method includes receiving, with a transceiver of a first computing device, a first message having first message metrics associated with a candidate entity for identification. The first message is processed, with a processor of the first computing device, to identify a first portion of a candidate entity identity based on the first message metrics. An output related to confidence of the candidate entity identity is produced, with the processor, based on the first portion of the candidate entity identity.

16 Claims, 15 Drawing Sheets

(56) References Cited

U.S. PATENT DOCUMENTS

| | | | |
|---|---|---|---|
| 2015/0281263 A1 | 10/2015 | McLaughlin et al. | |
| 2017/0032412 A1* | 2/2017 | Scharber | G06Q 30/0248 |
| 2017/0032413 A1* | 2/2017 | McCartney | H04L 9/14 |
| 2017/0262878 A1* | 9/2017 | Cetintas | G06Q 30/0273 |
| 2018/0060743 A1* | 3/2018 | Chak | G06N 3/0454 |
| 2018/0152471 A1* | 5/2018 | Jakobsson | G06Q 50/01 |
| 2019/0050596 A1* | 2/2019 | Barday | G06F 21/606 |
| 2019/0213476 A1* | 7/2019 | Singh | G06N 3/08 |
| 2019/0230122 A1* | 7/2019 | Chin | H04L 41/16 |
| 2021/0042800 A1* | 2/2021 | Chandra | G06N 3/08 |
| 2021/0185066 A1* | 6/2021 | Shah | G06N 3/0445 |
| 2021/0318915 A1* | 10/2021 | Wang | H04W 84/18 |
| 2021/0318916 A1* | 10/2021 | Wang | H04N 21/26208 |

OTHER PUBLICATIONS

TLS Basics, from the Internet Society, downloaded Oct. 18, 2021 from https://www.internetsociety.org/deploy360/tls/basics/ and self-indicating as "current[] as of Dec. 2015" (at p. 1) (Year: 2015).*

ALPN Explained, from KeyCDN Support, downloaded Oct. 18, 2021 from https://www.keycdn.com/support/alpn (Year: 2021).*

Jayaraman, Balaji, Request handling—HTTP 1.0 vs 1.1 vs 2.0 Here's why I think you should switch to HTTPS, dated Nov. 2, 2015, downloaded from https://medium.com/@BalajiJayaraman/request-handling-http-1-0-vs-1-1-vs-2-0-here-s-why-i-think-you-should-switch-to-https-b5b6b9e2e9e2 on Oct. 26, 2021 (Year: 2015).*

Dilipkumar et al., Using machine learning to predict the value of ad requests, dated Jun. 1, 2020, downloaded Feb. 8, 2022 from https://blog.twitter.com/engineering/en_us/topics/insights/2020/using-machine-learning-to-predict-the-value-of-ad-requests (Year: 2020).*

Jatain, Vishveshwar, 7 common types of ad fraud (and how to prevent them), Blockthrough.com, dated Sep. 16, 2021, downloaded Jul. 18, 2022 from https://blockthrough.com/blog/7-common-types-of-ad-fraud-and-how-to-prevent-them/ (Year: 2021).*

William Koehren, Neural Network Embeddings Explained, Oct. 1, 2018, available at: https://towardsdatascience.com/neural-network-embeddings-explained-4d028e6f0526, further available at: https://web.archive.org/web/20181107085414/https://towardsdatascience.com/neural-network-embeddings-explained-4d028e6f0526 (Nov. 7, 2018, Way Back Machine Web Archives Capture).

Google, Machine Learning Crash Course: Embeddings, Oct. 2018, available at: https://developers.google.com/machine-learning/crash-course/embeddings/video-lecture, further available at: http://web.archive.org/web/20181001000000*/https://developers.google.com/machine-learning/crash-course/embeddings/video-lecture (Oct. 2, 2018, Way Back Machine Web Archives Capture).

Wikipedia, Knowledge Graph Embeddings, Publication Date: Unknown, Last Edited Jan. 30, 2022, available at: https://en.wikipedia.org/wiki/Knowledge_graph_embedding.

* cited by examiner

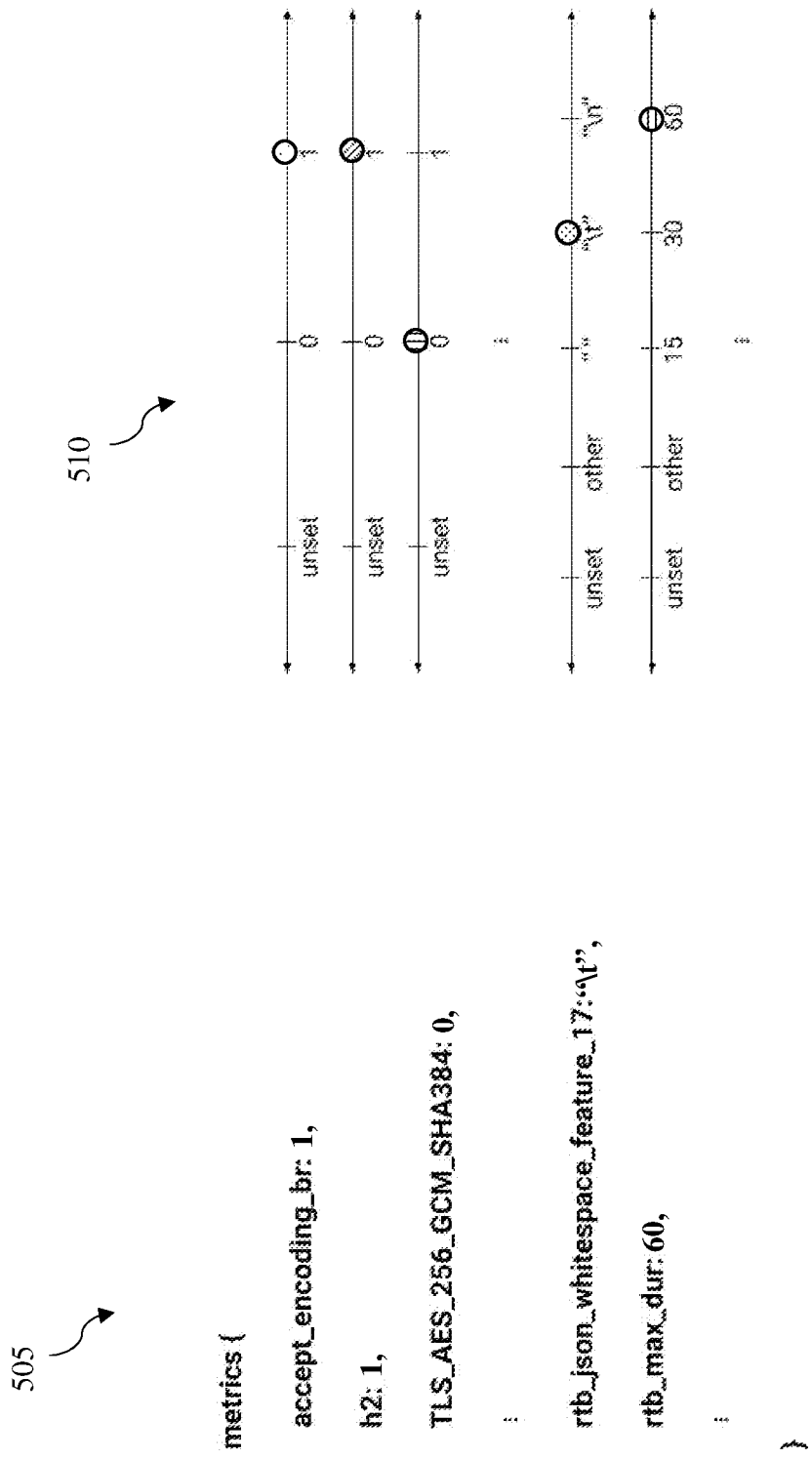

METHODS AND SYSTEMS FOR DETERMINING PROVENANCE AND IDENTITY OF DIGITAL ADVERTISING REQUESTS SOLICITED BY PUBLISHERS AND INTERMEDIARIES REPRESENTING PUBLISHERS

CROSS-REFERENCE TO RELATED APPLICATIONS

This application claims the benefit of the filing date of U.S. Provisional Application Ser. No. 63/061,602 titled "Methods and Systems for Determining Provenance and Identity of Digital Advertising Requests Solicited by Publishers and Intermediaries Representing Publishers" and filed Aug. 5, 2020 and the subject matter of which is incorporated herein by reference.

STATEMENT REGARDING FEDERALLY SPONSORED RESEARCH OR DEVELOPMENT

Not applicable.

INCORPORATION BY REFERENCE OF MATERIAL SUBMITTED ON A COMPACT DISC

Not applicable.

TECHNICAL FIELD

The present invention relates to the field of programmatic digital advertising fraud prevention software, and more specifically, to the field of over-the-top (OTT) advertising.

BACKGROUND

Businesses commonly engage in electronic commerce (E-commerce) and frequently use various programmatic digital advertising to find online electronic ad spaces across electronic networks. Such businesses looking for online electronic ad spaces generally depend upon demand-side computing platforms (DSPs) that commonly use or interface with the Internet. The network-based technology of programmatic digital advertising enables the automatic purchase of online electronic ad spaces that are offered across various electronic networks by digital ad sellers in an efficient manner, typically in real-time, known as real-time bidding (RTB) ad exchange. RTB ad exchange is based on the continuous exchange of electronic bid requests and bid response data traffic between the DSP servers and the RTB ad exchange servers over electronic advertising networks and the Internet.

A large number of broadcasters are expected to move into the online Over-the-Top (OTT) streaming service world. OTT generally refers to high-quality video content that is delivered through an internet-connected device rather than via a traditional satellite or cable broadcast connection. This high-quality video content may include content viewed on a Smart TV (such as Google TV® and LG Electronics Channel Plus®), gaming devices (such as Xbox One®, PlayStation®, and Wii U®), smart set-top boxes (such as Roku®, Google Chromecast®, and AppleTV®), desktops and laptops, tablets, and smartphones (such as iPhones®, Android Phones®, and Windows®).

Typically, an OTT ad is commonly 100% viewable and non-skippable before the user can consume or continue the OTT video content. The OTT ad inventory length can be 15, 30, or 60 seconds long. The success of the OTT ad is dependent on programmatic digital advertising, which allows for a business to better target and access new consumers that are not available via traditional TV through the collection of various performance metrics.

In recent years, the programmatic digital advertising industry has grown at such an enormous pace within the online OTT streaming service, such that the network resources (e.g., links, endpoints, and the like) required to handle the real-time bid request/response (RTB) ad exchange traffic are increasingly fraudulent activities. The automated buying and selling of advertising programmatic digital advertising can be more vulnerable to ad fraud than the traditional direct buying, that manipulates with the delivery of ad content and prevents its serving to the targeted audience. In fact, OTT service providers have difficulty handling the bots that are associated with the real-time bid request/response (RTB) ad exchange, further diminishing the effective performance of the programmatic digital advertisement. Research has found 20%+ of OTT ad requests are fraudulent, with well-known/expensive publishers being victimized more often.

The reasons for which programmatic digital advertising fraud occurring may include, first is that a programmatically purchased impression can pass through multiple buyers and sellers, providing more opportunities for a fraudster to take advantage. The second reason programmatic digital advertising is particularly vulnerable to fraud is that marketers instruct programmatic digital advertising buying teams to provide them with extraordinary low eCPMs (Effective Cost Per Thousand Impressions). This suggests an implied acceptance of ad fraud or instruction to deliver results that would be impossible without purchasing fraudulent impressions. Programmatic digital advertising automates the buying and selling of impressions; it does not create them.

As a result, there exists a need for improvements over the prior art to provide more efficient and effective fraud prevention software for businesses participating in online, programmatic digital advertising spaces, such as those provided by OTT services.

SUMMARY

A system and method for determining provenance and identity of digital advertising requests solicited by publishers and intermediaries representing publishers is disclosed. This Summary is provided to introduce a selection of disclosed concepts in a simplified form that are further described below in the Detailed Description including the drawings provided. This Summary is not intended to identify key features or essential features of the claimed subject matter. Nor is this Summary intended to be used to limit the claimed subject matter's scope.

In one embodiment, a computer implemented method for determining provenance and identity of a digital advertising request for an advertisement solicited by at least one of a publisher and an intermediary representing the publisher is disclosed. The method comprises receiving, with a transceiver of a first computing device, a first message having a plurality of first message metrics associated with a candidate entity for identification. The first message is processed, with a processor of the first computing device, to identify a first portion of a candidate entity identity based on the first message metrics. An output related to confidence of the candidate entity identity is produced, with the processor, based on the first portion of the candidate entity identity.

In another embodiment, the first message is processed to identify the first portion of the candidate entity identity. In processing the first message, the plurality of first message metrics associated with the first message are identified with the processor. The processor converts each of the plurality of first message metrics to at least one first message embedding. The at least one first message embedding represents at least a coordinate in a dimension of a plurality of dimensions. The at least one first message embedding is combined, with the processor, to a coordinate tensor. The processor then identifies, places or plots on the coordinate tensor at least one of (i) a candidate entity cluster associated with the at least one first message embedding and (ii) no candidate entity cluster associated with the at least one first message embedding.

In another embodiment, a first response is generated with the processor. Generating the first response comprises first processing, with the processor, the first message through a neural network to determine at least one expected output message metric for at least one respective currently unknown message metric. Then, the processor calculates which of the at least one respective currently unknown message metric exhibits an instability based on the at least one respective expected output message metric. In one embodiment, the instability is a measurement of propensity of an embedding to move relative to an identified candidate entity cluster. Instability is the instability of the dimension over the normalized change in the currently known metric which triggers the instability (based on the experiment). The first response to the first message comprises at least one sending, with the transceiver, to the candidate entity a second message; sending, with the transceiver, to the candidate entity after a first delay the second message; and, sending, with the transceiver, no message within a first predetermined amount of time. The first response is based on which of the at least one respective currently unknown message metric exhibits the instability and in some cases the most instability. Further, a first reply to the first response is received, with the transceiver, from the candidate entity. The first reply to the first response comprises at least one of (i) a third message having third message metrics within the first predetermined amount of time; and, (ii) no message within the first predetermined amount of time.

In yet another embodiment, after receiving the first reply, the processor processes the first reply to identify a second portion of the candidate entity identity. The processor then identifies a more complete candidate entity identity using the plurality of first message metrics and the first reply.

In another embodiment, after producing the output that the candidate entity identity has a level of confidence based on at least one of the first portion and the second portion of the candidate entity identity, the processor generates a second response to at least one of the first message and the first reply. The second response comprises at least one of (i) sending, with the transceiver, to the candidate entity a fourth message; or (ii) sending, with the transceiver, after a second delay, to the candidate entity the fourth message; and, (iii) sending, with the transceiver, no message within a second predetermined amount of time. The processor then receives from the candidate entity a second reply to the second response. The second reply comprises at least one of a fifth message having fifth message metrics within the second predetermined amount of time; and no message within the second predetermined amount of time. The neural network is updated, with the processor, based on receiving an accumulation of said second replies.

In yet another embodiment, prior to receiving the first message, the neural network is trained by first receiving, with the transceiver, a plurality of third messages having third message metrics. Each of the plurality of third messages is received from at least one of a plurality of second computing devices. The plurality of third message metrics is processed, with the processor, to generate the neural network. The neural network is stored in a connected database associated with a plurality of identities.

In another embodiment, the instability is further defined as the measurement of propensity of the embedding to move relative to the identified candidate entity cluster based on a change to a message metric. In other words, instability is a measurement of propensity of an embedding to move relative to a candidate entity cluster with smaller changes to metrics than predicted.

Additional aspects of the disclosed embodiment will be set forth in part in the description which follows, and in part will be obvious from the description, or may be learned by practice of the disclosed embodiments. The aspects of the disclosed embodiments will be realized and attained by means of the elements and combinations particularly pointed out in the appended claims. It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute part of this specification, illustrate embodiments of the invention and together with the description, serve to explain the principles of the disclosed embodiments. The embodiments illustrated herein are presently preferred, it being understood, however, that the invention is not limited to the precise arrangements and instrumentalities shown, wherein:

FIG. 5A is an example of code having metrics from a message, according to an example embodiment;

FIG. 5B is an example of an embedding of the metrics from FIG. 5A, according to an example embodiment;

DETAILED DESCRIPTION

Figure 1:
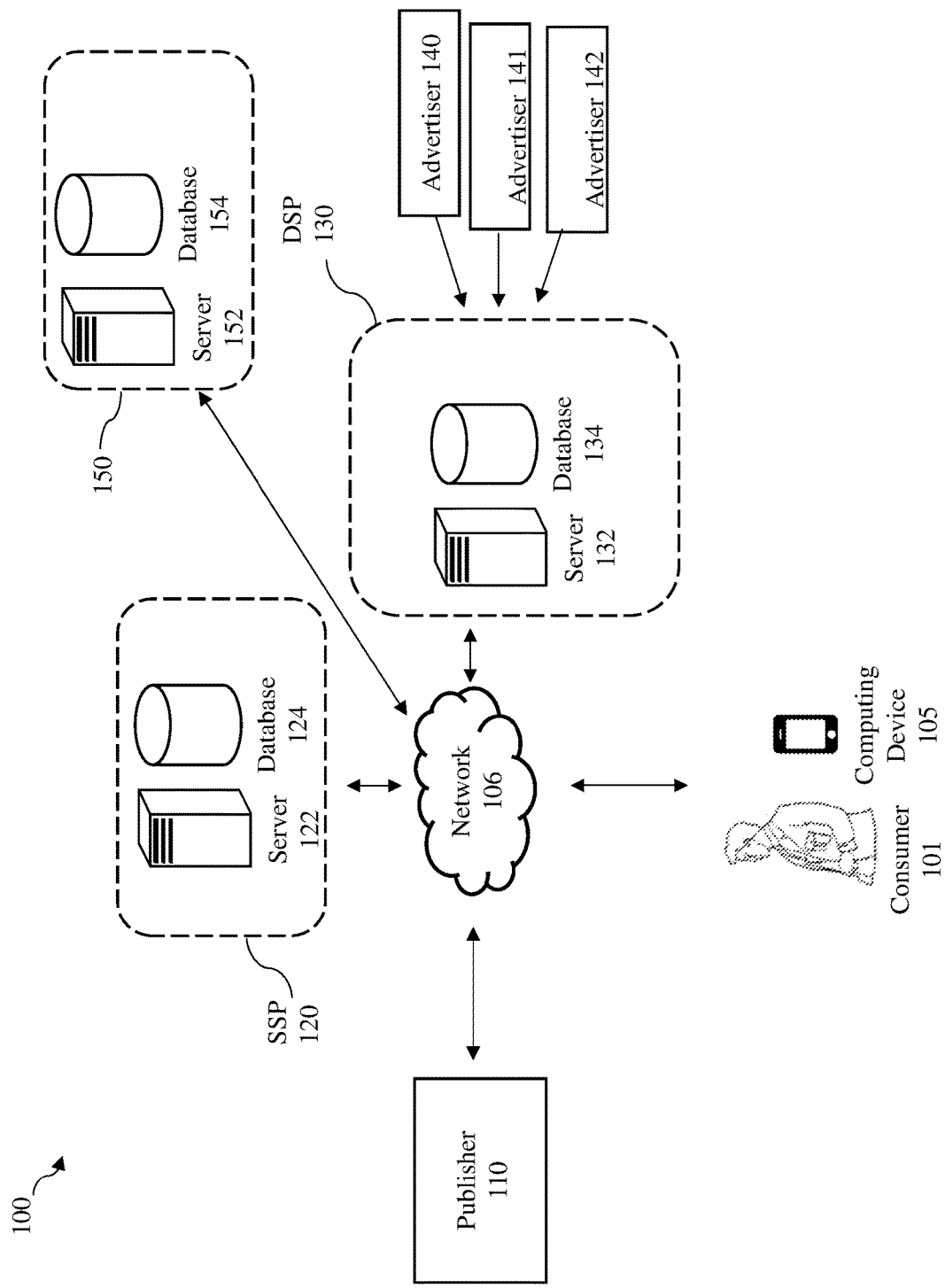
FIG. 1 is a diagram of an operating environment that supports applications, methods, and systems for determining provenance and identity of digital advertising requests solicited by publishers and intermediaries representing publishers, according to an example embodiment.

The following detailed description refers to the accompanying drawings. Whenever possible, the same reference numbers are used in the drawings and the following description to refer to the same or similar elements. While disclosed embodiments may be described, modifications, adaptations, and other implementations are possible. For example, substitutions, additions or modifications may be made to the elements illustrated in the drawings, and the methods described herein may be modified by substituting reordering, or adding additional stages or components to the disclosed methods and devices. Accordingly, the following detailed description does not limit the disclosed embodiments. Instead, the proper scope of the disclosed embodiments is defined by the appended claims.

The disclosed embodiments improve upon the problems with the prior art by providing a programmatic digital advertising fraud prevention software tailored for over-the-top (OTT) services since signals such as cookies, JavaScript®, and user behavior indicators are applicable only for desktop and mobile environments and not OTT services. This programmatic digital advertising fraud prevention software provides for a more efficient way of allowing businesses in the online electronic ad, programmatic digital advertising spaces to prevent fraud by the use of a proprietary two-prong method which uses Cryptographic Inventory validation and Deep Learning Smart Pixels (DLS pixels) to evaluate and score the reported identity of every digital ad request, and monitor subtle differences in the behavior of each app, creating a valid identity "fingerprint" (i.e., candidate entity identity) for the application.

Digital advertising is regularly conducted through intermediaries who relay requests for advertising from publishers to advertisers and back to publishers. Often, the complete sequence of intermediaries used can be long and complex, with many intermediaries unknown to both the publishers and the advertiser. This, coupled with a lack of any form of cryptographic identity or message validation in most advertising protocols has fostered an ecosystem that is irresistible to fraudsters and trivial to exploit.

Compounding this issue is a great degree of vagary, or unpredictable changes, in the advertising protocols themselves. The vagaries exacerbate the margins lost to fraud by adding additional losses due to innocent inability to reconcile transaction volumes and the human attention devoted to correcting them by hand.

The method according to embodiments of the present disclosure operates directly on the very diversity that plagues current advertising technology. Through measurement to all dimensions of advertising request transactions, the diversity and nonuniformity of the intermediaries' interactions are converted into a coordinate tensor which serves to uniquely identify the sequence of intermediaries, thereby removing the opacity of current supply chains. With a positive identity in hand, it is then far easier to distinguish between legitimate, accidentally- and intentionally-mislabeled inventory, and allow the end-user to respond accordingly. Essentially, the system provides an interactive zero-knowledge proof of identity of a candidate entity where here the evaluation of whether the proof is sufficient is done with machine learning.

As described in greater detail below, the systems and methods described herein for determining provenance and identity of digital advertising requests solicited by publishers and intermediaries representing publishers utilizes metrics associated with the transfer of data from entities to ultimately determine the confidence of a candidate entity identity. The methods generally utilize neural networks to predict expected outputs based on training metrics data for currently unknown metric(s). After selecting the currently unknown metrics that exhibit properties that may gain additional information into the identity of the entity, then one or more requests are made to the candidate entity to provide the unknown metric(s) and once received from the candidate entity, the metrics are then processed to coordinate tensor to form zero or more than one candidate entity clusters, which are then compared to the known entity clusters of entities. In some instances, the messages seek to gain additional information based on which of the currently unknown message metric exhibits the most instability with smaller changes to metrics than predicted. An indication of the confidence of a candidate entity identity is then made by the comparison of identities of the candidate entity with the known identities. Thus, requests from untrustworthy candidate entities can be eliminated, thereby reducing, and/or eliminating fraud in OTT digital advertising systems. Accurate identification is necessary to determine whether such advertising requests are legitimate, accidentally misidentified, or intentionally fraudulent, the latter often referred to as "sophisticated invalid traffic" (SIVT) in the business of advertising.

In addition to the applications of the methods and systems described herein for OTT digital advertising systems, the methods and systems described herein may also be applicable to other programmatic digital systems for determining the trustworthiness of digital entities that make of the digital advertisement supply chain. For instance, the methods and systems described herein may be applicable to other digital advertisement systems other than OTT advertising. The methods and systems described herein may also be useful for other programmatic digital systems such as financial technology systems, online gambling systems, and online retail systems, among others. Such applications of the systems and methods described herein are also within the spirit and scope of the invention.

Referring now to FIG. 1, a diagram of an operating environment that supports applications, methods, and systems for determining provenance and identity of digital advertising requests solicited by publishers and intermediaries representing publishers is depicted, according to an example embodiment. The operating environment provides a system for determining provenance and identity of digital advertising requests solicited by publishers and intermediaries representing publishers. The operating environment shows a user (e.g., a consumer) 101 on a computing device 105, a network 106, a publisher 110, a supply side provider ("SSP") 120, a demand side provider ("DSP") 130, and a plurality of advertisers 140-142. The computing device 105, publisher 110, SSP 120 and DSP 130 are configured to interact via the network 106, such as via the internet. The SSP 120 comprises at least one server 122 and at least one connected database 124. Similarly, the DSP 130 comprises at least one server 132 and at least one connected database 134. The publisher 110 is configured to display on-demand content (e.g., digital videos) to the consumer 101 on the computing device 105. The SSP 120 is configured to display a plurality of advertisements within at least one portion of ad space on the consumer's 101 computing device 105. The DSP 130 is configured to interact (e.g., receive advertisement content and any other applicable data) with the plurality of advertisers 140-142. The operating environment, may comprises at least one server 152 and at least one connected database 154 of the system. The system may in combination with any entity of the digital advertisement supply chain. While FIG. 1 shows the system entity 150 to be a separate entity, it is understood that the system may be performed by any of the publisher 110, SSP, DSP or advertiser 140, 141, 142.

It is to be understood that the aforementioned platforms of system may be designed and configured to include fewer, more, or different components, and the division of work between the components may vary depending on the arrangement. It should be understood that the system may include additional computing devices which are associated with intermediating platforms, other platforms, or entities or various combinations thereof. For example, in one embodiment, DSP 130 may be designed and configured to function as both a DSP and a SSP, wherein the SSP is configured to assist publisher 110 in managing advertising impression inventory and maximizing revenue from digital media and the DSP 130 is configured to assist in automation of ad purchases from SSP 120 by connecting one or more advertisers 140-142 to consumer 101 via real-time bidding (RTB). It should also be understood that one or more publishers 110 may be providing information to each SSP 120 platform. By way of another example, it is understood that one or more SSPs 120, one or more DSPs 130, one or more advertisers 140-142, one or more computing devices 105, and one or more consumers 101 may be used and is within the spirit and scope of the claimed embodiments. In other embodiments, the consumer device 105 may transmit data directly to the SSP 120, which in turn transmits data to the DSP 130. It is understood that these are not limiting embodiments and other embodiments may be within the spirit and scope of the present invention.

Computing device 105 may be a computing device such as, but not limited to a mobile phone, tablet, smart phone, smart tv, application, over-the-top (OTT) media service, streaming platform, desktop, laptop, wearable technology, or any other device or system comprising a processor, and is configured to host and display advertisements. Advertisements as described herein, include but are not limited to picture/visual, audio, video, and/or combination of the aforementioned content thereof that may be retrieved by computing device 105 and/or SSP 120 for publishing purposes.

The publisher 110 devices or SSP devices 120, which generally take the form of servers 122, provide compelling media content that attracts consumers 101, thereby providing an opportunity to sell an advertisement impression. Similarly, advertiser 140-142 devices, which also generally take the form of servers, provide advertisements in the form of audio and/or visual media content that can be retrieved by consumer devices 105 and/or publisher 110 devices and viewed in conjunction with and/or prior to the media content provided by publishers 110. In many cases, the advertiser can select specific advertisement targeting criteria which define the target audience for a particular advertisement, as well as various other rules that outline how, when, and/or to whom the advertisement may be served by a publisher in order to receive credit and/or payment for an advertisement impression. The information and data provided by the advertiser(s) 140-142 may be stored in the DSP 130 database(s) 134 or may be provided to the DSP upon request.

FIG. 1 further shows several servers (122, 132, 152) and database/repositories (124, 134, 154). Non-limiting examples of databases include relational databases comprising a Structured Query Language (SQL) database stored in a SQL server, and databases that adhere to the NoSQL paradigm. Other devices associated with the system may also each include databases. The databases (124, 134) may serve data, as well as related information, used by servers (122, 132, 152) and devices of the system during the course of operation of the invention. It is understood that the database(s) (not illustrated) associated with one or more advertisers 140-142 may be associated with the DSP server 132, a database associated with a plurality of advertisers or any combination thereof. Additionally, it shall be understood that SSP 120, advertiser(s) 140-142, and other entities within system may also include databases in communication with their associated servers.

As noted above, the systems and methods described herein may also be useful in other digital programmatic systems. Thus, other digital programmatic systems may utilize a similar operating environment with different entities. That is, entities other than an SSP, DSP, publisher, and advertisers may communicate via a network in an operating environment configuration similar to the illustrated embodiment.

Figure 2A:
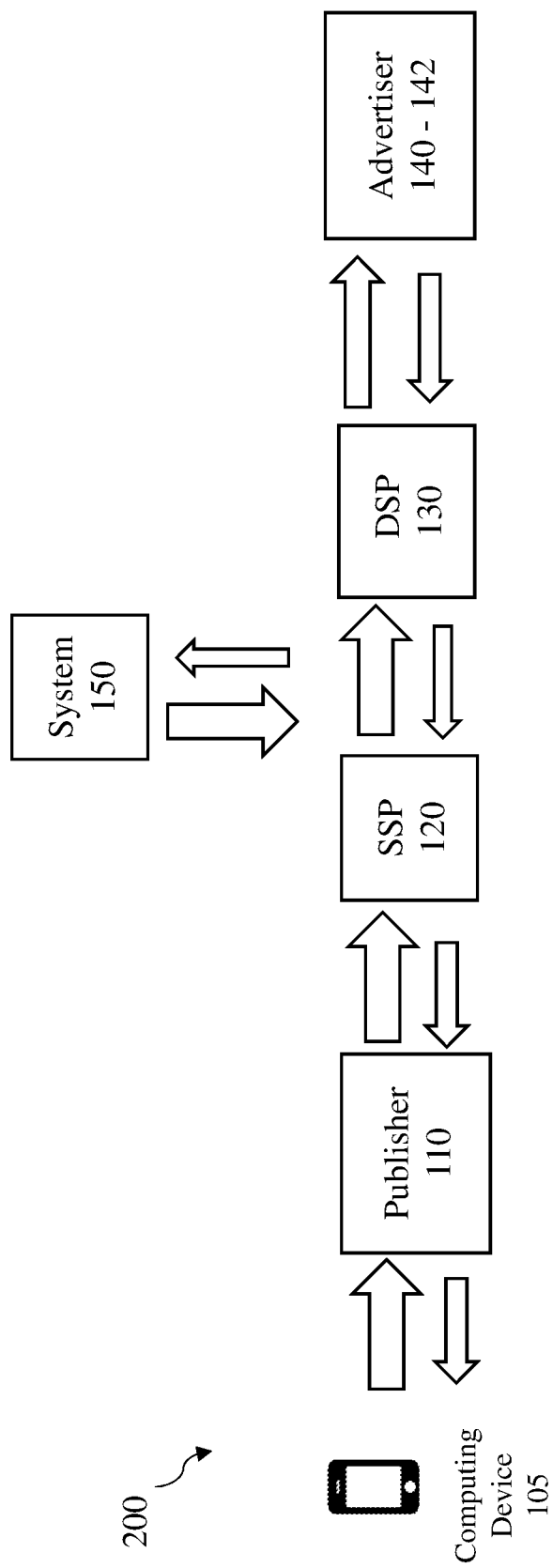
FIG. 2A is a diagram illustrating the flow of data between a plurality of entities for an embodiment of a method for determining provenance and identity of digital advertising requests solicited by publishers and intermediaries representing publishers; according to an example embodiment.

With reference now to FIG. 2A, block diagram of an example embodiment of a flow chart 200 illustrating the flow of data between a plurality of entities for a method for determining provenance and identity of digital advertising requests solicited by publishers and intermediaries representing publishers 110 is shown. As understood by one skilled in the art, provenance refers to the method of generation, transmission, and storage of information that can be used to trace the origin of information processed by several entities. As illustrated by the flowchart 200, data flows to and from computing device 105 and publisher 110, publisher 110 and SSP 120, SSP 120 and DSP 130, DSP 130 and advertisers 140-142. In this regard, data flow between the entities may be sent via messages from one entity to another. In one embodiment, computing device 105 may request content from publisher 110 and certain data or metrics 2005 about the user (not illustrated) operating the computing device 105 may be included in the message. Data about the user could include certain interests or hobbies, age, geographical location, and user behaviors, among others. As discussed in greater detail below, this data will be passed onto subsequent entities and the messages sent between entities will accumulate these data. It is understood that the system entity 150 will be sent message from the candidate entity, which will be received by the transceiver of the computing device associated with the system. Additionally, it is understood that the system entity 150 will send message to the candidate entity via the transceiver of the computing device associated with the system. As mentioned above, system entity 150 is shown to be separate from the SSP, DSP and advertisers, it is understood that the system and methods performed by the system entity may be performed by the SSP, DSP and advertisers or other entities not associated with the candidate identity. In other embodiments, the system entity 150 may an additional link in the digital advertisement supply chain.

Figure 2B:
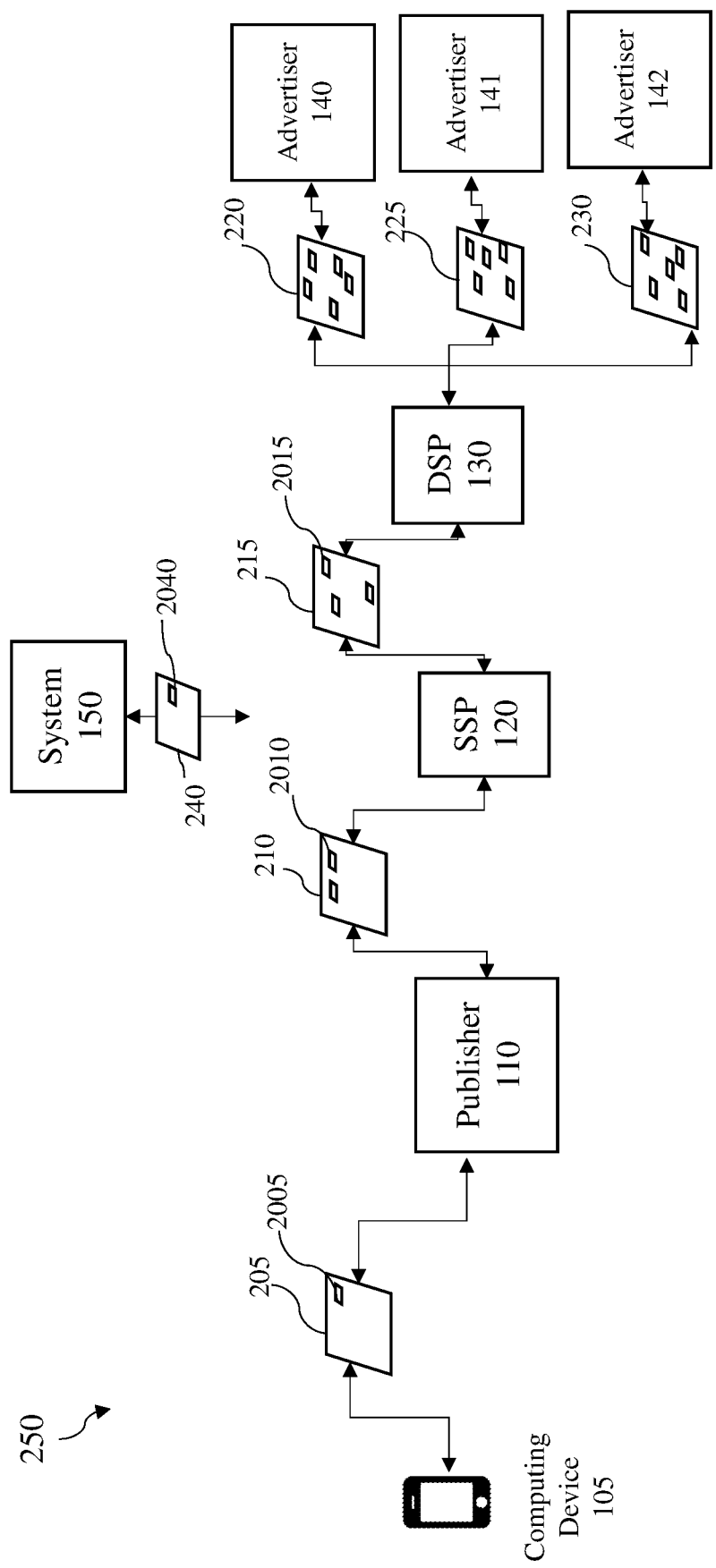
FIG. 2B is diagram illustrating a more particular embodiment of FIG. 2A, where the flow of data includes metrics associated with each of the entities, according to an example embodiment.

With reference now to FIG. 2B, a block diagram illustrating a more particular example embodiment of data flow 250 of FIG. 2A is shown. The flow of data between device 105 and entities (110, 120, 130, 140-142, 150) includes messages of data that may include metrics (205, 210, 215, 220, 225, 230, 240) associated with each of the entities. It is understood that metrics may be derived from segments of code or snippets of code that allow monitoring of a specific metric, such as if a user clicks on a link, an ad impression is fired, or if an ad was viewed. Metrics also allow the advertiser to engage with users by showing them relevant content or ads. Additional types of metrics are discussed below. However, it is also understood that other indicators may also be used as metrics and are within the spirit and scope of the present invention. In one embodiment, as shown, one or more messages 205 sent from computing device 105 include metrics 2005. These metrics 2005 are embedded in the code of the message(s) 205 and may also be associated with properties of the message 205. In one embodiment, metrics discussed herein may be associated with the protocols used to transmit the message. Such protocols that may be useful include Transmission Control Protocol (TCP), Hypertext Transfer Protocol (HTTP), Real-Time Bidding (RTB), JavaScript Object Notation (JSON) and Extensible Markup Language (XML), among others. Additionally, metrics may be associated with other indicators, such as quantity, frequency, time, and other measurable parameters.

By way of example, a user (not illustrated) operating computing device 105 may request a video from publisher 110, such as from an online video platform such as YouTube, Vimeo, etc. The message sent from computing device 105 to publisher 110 may include data, such as keywords associated with the requested video that can be used in the advertisement supply chain to send targeted ads to the user's computing device. Properties of the message 205 may include information, such as the time and date that the message is sent or the internet service provider from which the message originates, among others. Regardless, data that includes metrics 2005 associated with message 205 are received and processed by publisher 110. Publisher 110 may then make a request via message 210 to SSP 120 that includes metrics 2010. Metrics 2010 may include all or a portion of metrics 2005, and generally may include additional metrics associated with the publisher's 110 request. In one embodiment, additional metrics to be provided by publisher 110 might include the publisher's 110 name, other identifying information about publisher 110, and information about the video requested by the consumer, among others. In one embodiment, the video requested by the consumer might be known by publisher 110 to be popular with certain demographics (e.g., by age, ethnicity, geographical location) and this information may be included in metrics 2010. Additional metrics for 2010 may include segments of code that identify how long a publisher ad server hold open a slow HTTP connection when downloading assets for transcoding," "whether the advertisement sdk/player embedded in the publisher's software on the viewer's device fire the VAST events for creative view before impression, after, or at the same time." These metrics are typically transmitted by the publisher or related entities in the digital advertisement supply chain. VAST is a Video Ad Serving Template for structuring ad tags that serve ads to video players.

The SSP 120 can then process the metrics 2010 and send a message to DSP 130. Similarly, the request from SSP 120 to DSP 130 is sent via message 215 that includes metrics 2015. The SSP 120 may add additional metrics that are specific to the identity of the SSP. DSP 130 processes message 215 and associated metrics 2015. The DSP 130 will then notify advertisers 140-142 of the potential to advertise on the consumer's computing device 105. Advertisers 140, 141 and 142 respond to the DSP 130 with messages 220, 225 and 230, respectively. Advertisers 140-142 may choose to pay for the consumer to view an advertisement on the computing device 105 and may participate in a bidding contest to have their advertisements consumed. Thus, a plurality of messages may be sent back and forth between DSP 130 and one or more of advertisers 140-142 prior to sending an advertisement via data flow from the DSP 130 to SSP 120 to publisher 110 to computing device 105. An advertisement viewed by a consumer may be referred to herein as an "ad impression."

The system entity 150 that includes server 152 and connected database 152 in one embodiment may be used in conjunction with the SSP, DSP or advertiser 140, 141, 142. In other embodiments, the system entity may use the processor and transceiver of any of the SSP, DSP or advertiser 140, 141, 142 for performing some or all of the steps identified in the claims. In other words, the methods and system for determining provenance and identity of a digital advertising request for an advertisement solicited by at least one of a publisher and an intermediary representing the publisher may be performed by servers and connected databases of the SSP, DSP or advertiser 140, 141, 142. While FIG. 1 shows the system entity 150 to be a separate entity, it is understood that the system may be performed by any of the SSP, DSP or advertiser 140, 141, 142. It is understood the system entity may include the processor (as further explained below) and the transceiver. The processor of the system entity may be used to perform some or all of the steps identified in the claims (further explained below). Additionally, the transceiver may be used for receiving messages from and sending messages to the candidate entity identity. Referring back to FIG. 2B, as mentioned above the system entity 150 may be configured for sending and receiving messages 240 having metrics 204 from the candidate entity, where the candidate entity may be any one the computing device, publisher, SSP, DSP or advertiser 140-142 or any entity acting on said entities behalf. As mentioned above, the system entity may be any one the computing device, publisher, SSP, DSP or advertiser 140-142 and that is not associated with candidate entity. In other embodiments, the system entity 150 may used in conjunction with the computing device, publisher, SSP, DSP or advertiser 140-142 that is not associated with candidate entity. In other embodiments, the system entity may be another entity associated with the digital advertisement supply chain that is not the candidate entity.

As known to those skilled in the art, the advertisement supply chain is automated and messages sent between the various device 105 and entities (110, 120, 130, 140-142, 150) are sent, received, and processed on the order of milliseconds. Thus, the advertisement supply chain may be susceptible to fraudulent actors that take advantage of the automated activities. For example, fraudulent actors may utilize bots to "spoof" the selling of advertisements to consumers. Ad impressions consumed by fraudulent actors, such as bots, are not credible and do not help advertisers meet the end goals of their advertisement campaigns. The fraud associated with the digital advertisement supply chain results in a lower price per advertisement view, sometimes referred to as cost per mile (CPM). Lower CPMs put publishers at a disadvantage to fully leverage their advertisement inventory and result in lower returns on investment for advertisers. As will be discussed in greater detail below, the metrics comprising segments of code associated with messages sent to-and-from the device 105 and various entities (110, 120, 130 and 140-142) can be used to verify the confidence, or trustworthiness, of the various entities in the digital advertisement supply chain by leveraging the power of machine learning algorithms (e.g., neural networks and clustering algorithms). Verifying the confidence of the various entities ultimately improves publisher CPMs which leads to increased inventory value for the publisher and increased return on investment for advertisers.

Figure 3A:
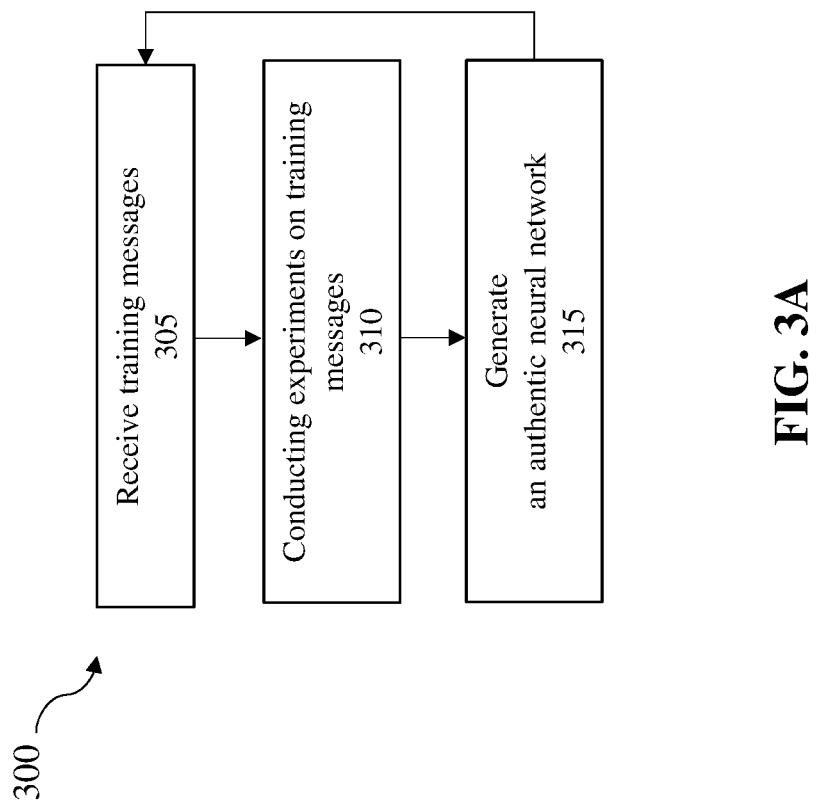
FIG. 3A is a flow diagram illustrating main components of a process flow of the processing of a plurality of training messages having metrics to generate an authentic neural network, according to an example embodiment.

With reference now to FIG. 3A, a block flow diagram illustrating a process flow 300 for the processing, by the computing device of the system, of a plurality of messages having metrics to generate an authentic neural network 370 according to an example embodiment is shown. The messages use to train or generate the neural network may be known as training messages. As illustrated, process flow 300 includes in step 305 receiving, with the transceiver of the system entity, a plurality of training messages 360, conducting, with the processor of the system entity. Next, in step 310, the server 152 will conduct experiments on the messages. Next, in step 315, the server will generate with the processor of the system entity, an authentic neural network 370.

In one embodiment, the receiving step 305 comprises receiving, with the transceiver of system entity, a plurality of training messages from a plurality of entities. The entities use to train the neural network may be entities having a level of confidence that ensures the neural network is based on correct or accurate information. Each training message typically has a plurality of training message metrics associated with each of the entities. These messages will be used to train the neural network and also to establish identities to which the candidate entities will be compared to provide an indication as to if the candidate entity has required level of confidence that the candidate entity is indeed the entity that it alleges to be (or is trustworthy or not trustworthy). In this application use of the term "entity" or "entities" may mean a computing device(s) associated a particular party.

In step 310, the system will conduct, with the transceiver of system entity, experiments, including processing the plurality of training message metrics though a neural network. Next, in step 315, to generate or update a neural network 370 of known metrics associated with the training message metrics, experiments can be conducted between the party utilizing the systems and methods described herein and any of the parties in the supply chain to obtain a candidate entity identity for that party.

Furthermore, the method may comprise the processor of the server 152 of the system entity storing the neural network associated with the plurality of entities in a connected database 154. Types of neural networks that may be generated from the training messages may include perceptron, feed forward, radial basis network, deep feed forward, recurrent neural network, long/short term memory, gated recurrent unit, auto encoder, variational auto encoder, denoising autoencoder, sparse autoencoder, Markov chain, Hopfield network, Boltzmann machine, restricted Boltzmann machine, deep belief network, deep convolutional network, deconvolutional network, deep convolutional inverse graphics network, deep residual network, Kohonen Network, Support Vector Machine, and Neural Turing Machine, among others. However, other types of neural networks may be used and are within the spirit and scope of the present invention. It is also understood that as additional messages are received, the neural network is configured to be trained and adapt from the processing of the metrics received from both known trustworthy and not trustworthy entities.

As mentioned above, messages sent between entities typically contain metrics comprising segments of code associated with the sending entity, such as properties related to the message (e.g., time and date sent, identifying info about the entity, etc.) and other information that can be used to selectively advertise to consumers (e.g., demographics, user interests, etc.). In this way, entities may retain the messages and use the messages having the metrics for training an authentic neural network. In other words, entities can leverage their own data to train neural networks to differentiate between fraudulent and authentic behavior. By way of example, a publisher may have a database of messages. The messages may have a variety of metrics associated with specific consumers, SSPs, DSPs and advertisers. Furthermore, the publisher may have classified certain messages as having originated from fraudulent entities and other messages as having originated from authentic entities. Such messages may be useful in training a neural network to differentiate between known fraudulent entities and known authentic entities, thereby improving the publisher's CPM and increasing their advertising inventory's value.

The experiment(s) performed in step 310 may measure how a vagary has been uniquely implemented by a transactional counterparty entity or intermediary entity (e.g., intermediary device). Examples of such measurements or metrics include, "how long does a publisher ad server hold open a slow HTTP connection when downloading assets for transcoding?" or "does the advertisement sdk/player embedded in the publisher's software on the viewer's device fire the VAST events for creative view before impression, after, or at the same time?" Experiments that may be performed on the metrics may include metrics from any combination of TLS Cipher Suite Selection (Cipher suite negotiated matches device OS), a preload list honored, TLS version and features (such as ALPN) match expectation, negotiation of HTTP 1.0, HTTP 2.0, or QUIC, timing thresholds (i.e., how long does device hold open connection until hanging up?), how many times and with what interval will device retry failed connections (i.e., retries), header structure (i.e., what HTTP headers provided (e.g., Keep Alive, Transfer Encoding, Accept-Encoding)), cookie retention (i.e., does http lib maintain cookie for session/permanently/never), cookie storage, max number of cookies permitted to device, max length of cookie permitted to device, behavior past max (truncate, rotate out, etc.), version variance (i.e., does player/publisher server/SSP accept non-standard versions, e.g., for VAST version "5.0," version "2.0d"), payload size (i.e., at what size does player/publisher server/SSP reject markup; does the threshold vary if payload is compressed; is ad play delayed, fault tolerance (i.e., which portions of markup are permitted to contain invalid markup), wrappers, redirect (i.e., how many level of redirection supported for markup requests; VAST wrapper vs HTTP redirect; are loops followed forever or stopped as soon as detected), VAST sequencing (i.e., what sequence does player return events in (e.g., IM-CV-ST or ST-IM, etc.); does player send ST at start of buffering or start of video play; do simultaneously-fired events fire when markup ordering is altered), HTTP Lib (i.e., support for less common urls, e.g., //server/event.gif), Cacheable timings (i.e., are nonce creative urls used by publisher/device or require at least one cache miss; what's minimum time for cache miss (e.g., nonce url created, but sent for first time within 2 milliseconds (ms) of each other); does player download video anew when same ad plays back to back), creative attempts (i.e., does publisher/player ever download creative), network geography (i.e., is CDN request retrieved from expected geographic network exit point), dimensional tolerations (i.e., if creative file exceed stated bounds for time, pixels, color depth, bitrate, at what point is creative rejected), jitter handling (i.e., how does player handle sudden failure of transmission during course of stream (ad skip, retry, error event fired) and after how long)), redirect parameters (i.e., how many levels of HTTP redirects supported for creative assets), transfer sequence parameters (i.e., are creative assets fetched in parallel, with capped parallelism, or in serial; in order of the markup, or in random order), Buffering timings (i.e., how far does progressive downloader buffer in advance, in bytes or duration), caching parameters (i.e., does publisher/player fetch with etag; is etag provided the nonce etag sent to different device), encoding parameters (i.e., which asset encoding complexities (e.g., mpeg profiles, non-square pixels, hdr encoding, etc.) return errors and/or halt downloads, and at what timings; how long until start/end of master asset transfer until first video play; is that duration proportional to asset duration/size/decode complexity), DNS timings parameters (i.e., how quickly are nonce hostnames resolved and contacted), DNS caching parameters (i.e., does a device which purports to have a first contact with server already have a dns resolution for server saved), events origin parameters (i.e., do events originate from player or publisher), creative origin parameters (i.e., is creative downloaded to player or publisher), waterfall type parameters (i.e., if ad request arrives through on exchanges which others does it arrive through; what timing and sequence between arrivals; do podded requests on one exchange arrive as individual requests on another exchange), mutations (i.e., what transforms are applied to same ad requests once processed through difference exchanges, e.g., added/removed fields, changes to min/max creative bitrates, duration, etc.), auction effect(s) (i.e., does same response to same request across exchanges produce similar result), trace parameters (i.e., where do the ad requests for visits to publisher land), distribution parameters (i.e., does category of requests falling to each exchange match publisher pattern (e.g., all requests to first exchange; less % of tv requests make it through to next exchange, but comparable level of desktop requests make it through, etc.)), textual characteristics (i.e., consistent use of casing; spelling errors in content, user agent, etc.), sequence characteristics (i.e., persistence of field ordering), looping characteristics (i.e., surge in number of ad requests from single device), publisher characteristics (i.e., surge in traffic), exchange characteristics (i.e., surge in traffic), and composition characteristics (i.e., sudden change in geographic, device type, time of day density of publisher audience). However, it is understood that other experiments on messages may also be included for training the neural network.

Figure 3B:
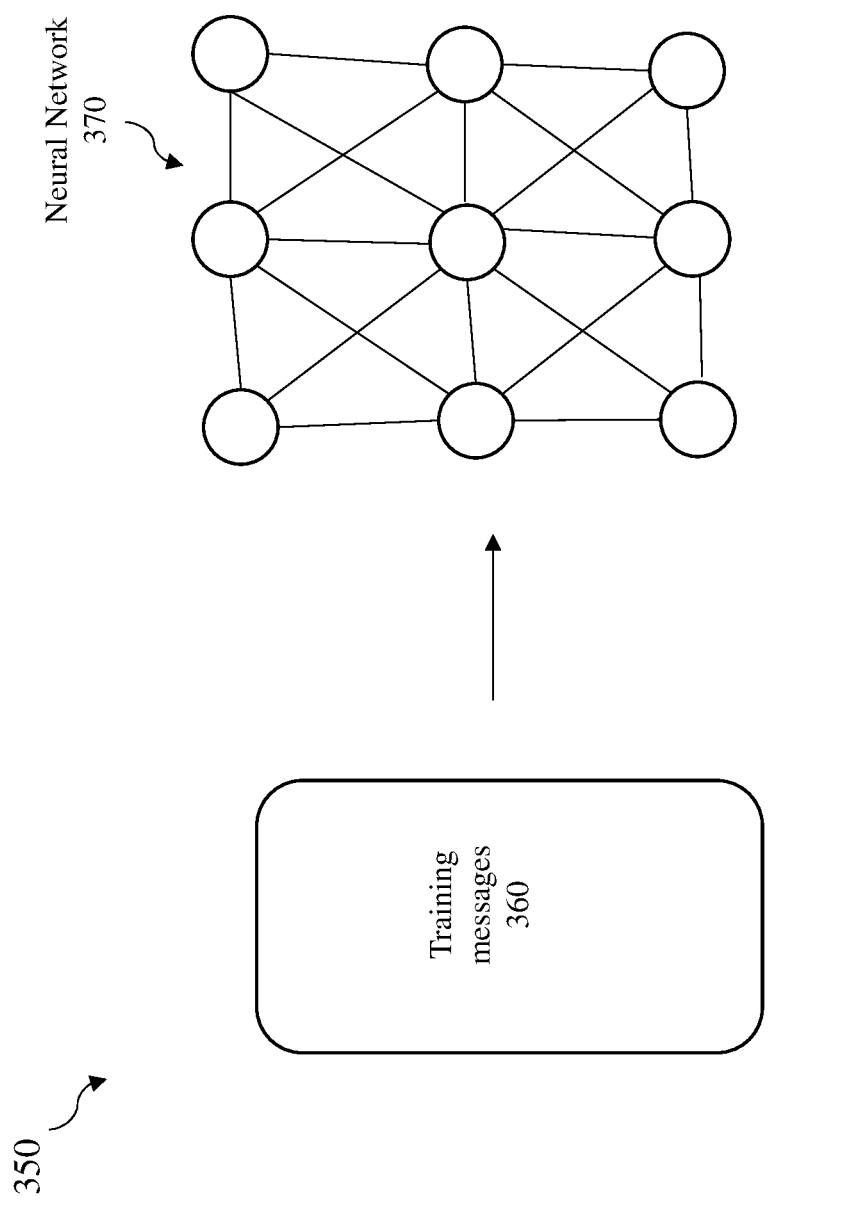
FIG. 3B is a diagram illustrating an embodiment for components of processing a plurality of training messages having metrics to generate an authentic neural network, according to an example embodiment.

As shown in FIG. 3B, the training messages 360 are processed by the neural network 370 using the processor of the server 152 of the system entity that may be stored in the connected database 154 of the system. Due to the neural network processing, the neural network can be used as a predictive tool. In one embodiment, given a supposed identity from a candidate entity and at least some metrics associated with the candidate entity identity, the processor using the neural network can make predictions about possible unknown metrics associated with the message provided by the candidate entity. A reply message can be generated by the processor of the system entity and sent by the transceiver of the system to the candidate entity to provide additional metrics. Once received by the transceiver of the system, the additional metrics from the candidate entity identity can be identified by the processor and compared by the processor to known entity identities of the system. In this regard, neural networks that may be useful may include perceptron, feed forward, radial basis network, deep feed forward, recurrent neural network, long/short term memory, gated recurrent unit, auto encoder, variational auto encoder, denoising autoencoder, sparse autoencoder, Markov chain, Hopfield network, Boltzmann machine, restricted Boltzmann machine, deep belief network, deep convolutional network, deconvolutional network, deep convolutional inverse graphics network, deep residual network, Kohonen Network, Support Vector Machine, and Neural Turing Machine, among others. However, other types of neural networks may be used and are within the spirit and scope of the present invention. As will be described in greater detail below, an indication of confidence of the candidate entity can be determined by processor of the system by comparing known identities with the metrics supplied by the candidate entity (which candidate entity metrics may be aggregated by the processor to form a candidate entity identity (e.g., digital fingerprint)), and the fraudulent behavior of candidate entities can be reduced.

As noted above, the systems and methods described herein may also be useful in other digital programmatic systems. Thus, other digital programmatic systems may similarly utilize the receiving training messages, conducting experiments on training messages, and generating an authentic neural network steps to the same effect, i.e., a trained neural network that may be used to establish the identities, known message metrics of the identities, to which the candidate entities will be compared to.

Figure 4A:
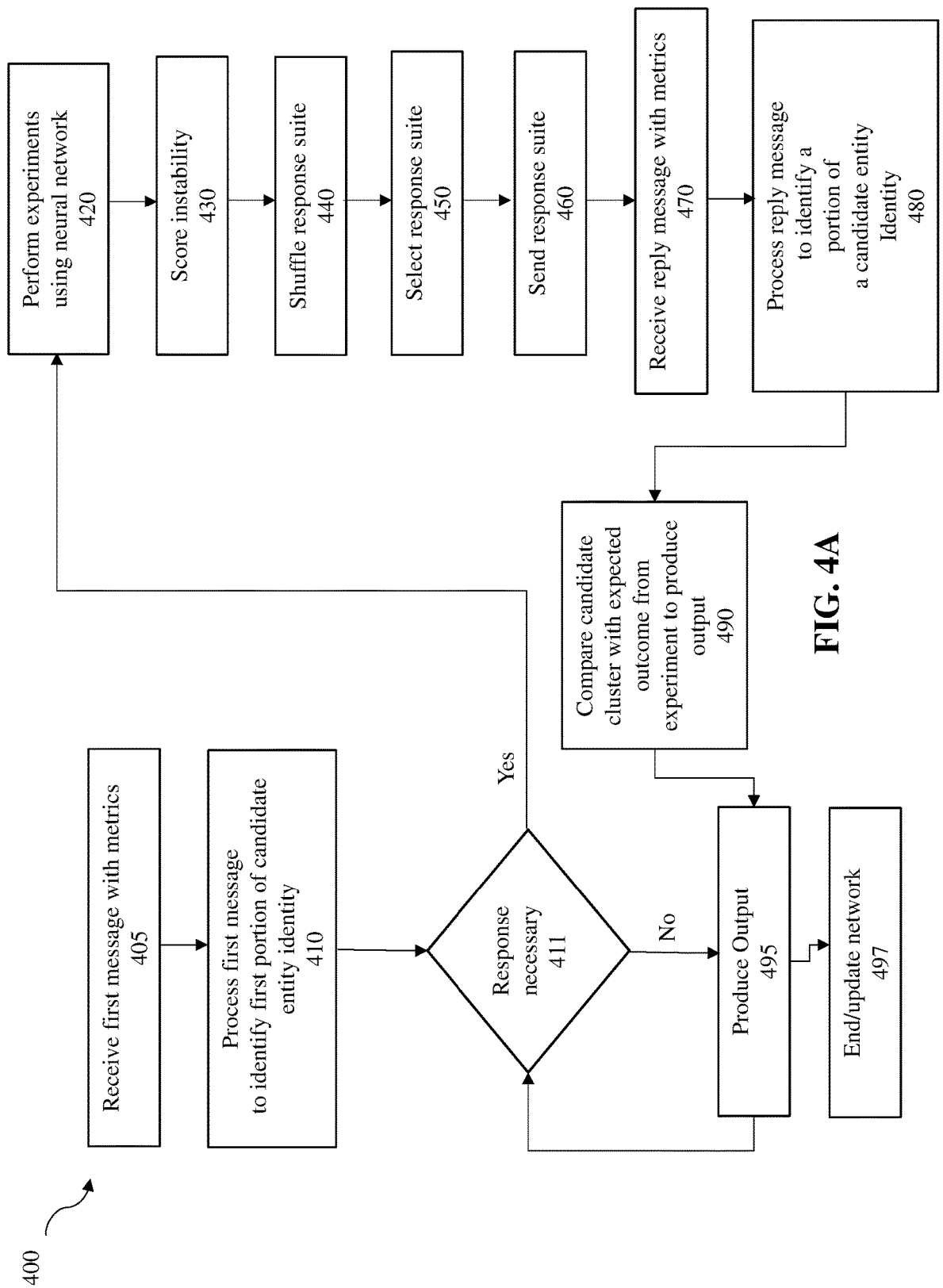
FIG. 4A is a process flow of a method for determining provenance and identity of digital advertising requests solicited by publishers and intermediaries representing publishers, according to an example embodiment.
Figure 4B:
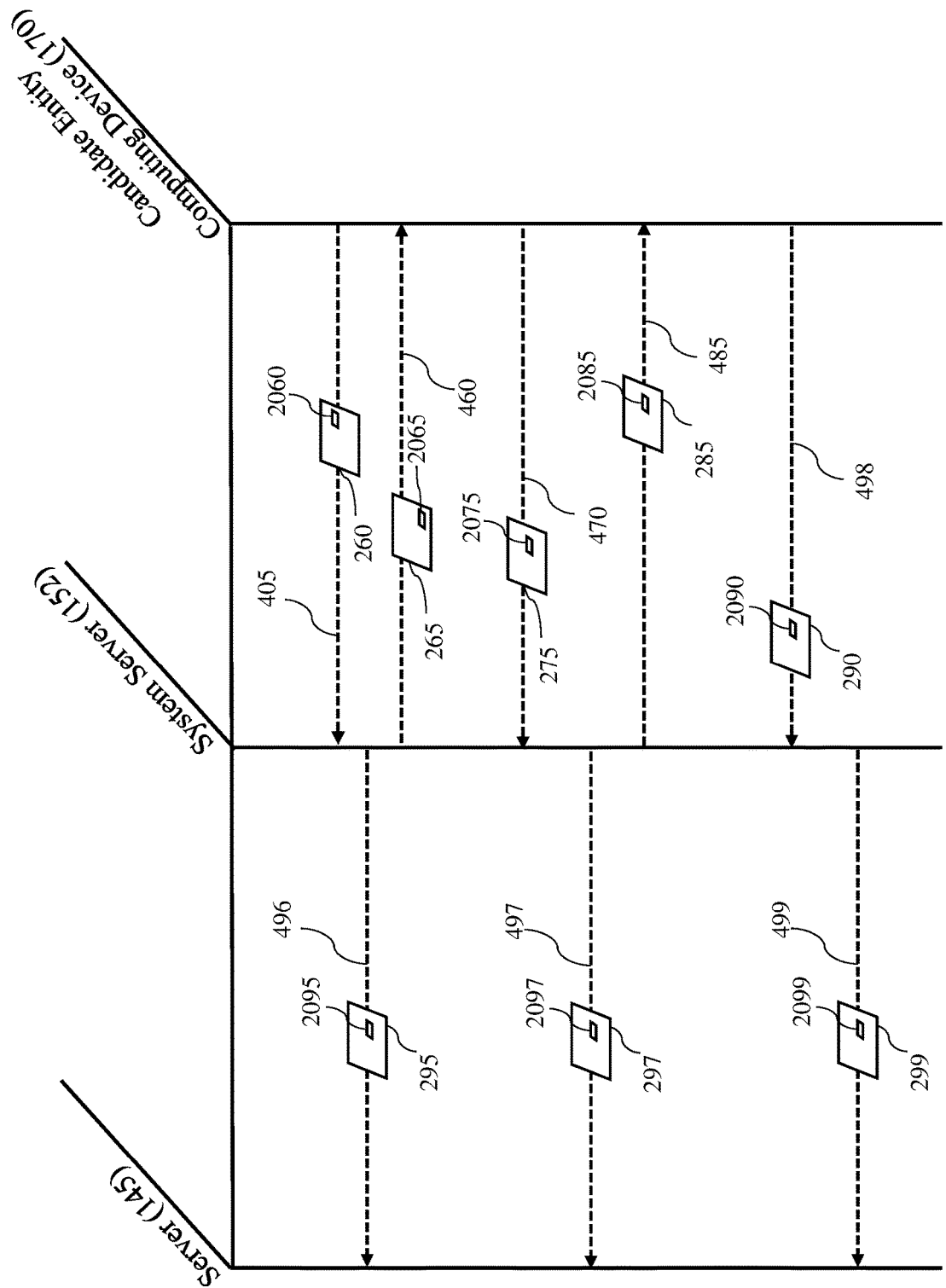
FIG. 4B is a schematic illustrating communications between the candidate entity, the system entity, and a second device of the system associated with the method for determining provenance and identity of digital advertising requests solicited by publishers and intermediaries representing publishers, according to an example embodiment.

Turing to FIG. 4A-4C, we discuss the process flow of the methods preformed. FIG. 4A is a process flow for determining provenance and identity of digital advertising requests solicited by publishers and intermediaries representing publishers is shown. FIG. 4B is a schematic illustrating communications and messages between the computing device or server 170 of the candidate entity, the server 152 of the system entity, and a computing device or server 145 of another entity of the advertisement supply chain.

The entity associated with server 145 may an advertiser 140, 141 or 141 or entity of the digital advertisement supply chain that desires to know or have with a level of confidence the candidate entity identity. Stated another, the entity associated with server 145 desires information as to if the candidate entity is a fraudulent entity or bad actor. As mentioned throughout this specification, the server 152 of the system entity may be (i) not associated with or is disparate from the candidate entity and (ii) may be used in conjunction with, may be separate from, or may be any one of the SSP, DSP, advertiser and publisher. In certain embodiments, the candidate entity may include a computing device having a computing device or server 170 having at least a processor and transceiver and may be acting as if it a publisher and an intermediary representing the publisher. The candidate entity is an entity of the digital advertisement supply chain.

In step 405, the process includes receiving with the transceiver of a computing device or system 152 of the system entity 150, a first message 260 that includes metrics 2060 or at least one metric. The first message generally includes first message metrics associated with a candidate entity which is sent by a computing device or server 170 associated with the candidate entity. In one embodiment, the candidate entity may be of computing device associated with a publisher, or a computing device associated with an intermediary claiming to represent the publisher. For example, in one embodiment, the SSP sends a request for advertisement for advertisement to an DSP and the provenance of the request and the identity of the publisher are initially assumed to be unknown. It is understood that this message may include the metrics of the other entities from the supply chain as well.

As an aside, after receiving a request for advertisement for advertisement, an attested identification are compared against the developer's app-adds.txt location specified in the store url. If the ad request satisfiers app-ads.txt it is facially valid. However, it is still unknown if (a) the publisher itself originally misrepresented the ad inventory as legitimate (e.g., the provenance is correct but the inventory is non-human, or otherwise mislabeled); (b) the list of authorized sellers is current; (c) the authorized seller misrepresented the ad inventory as legitimate; and (d) the SSP has allowed an unauthorized seller to sell under the identity of an authorized seller. Additionally, buyers must be aware that authorized inventory must still be screened and monitored for invalid traffic.

Next, in step 410, the first message is processed using the processor of the server or computing device 152 of the system entity 150 to identify a first portion of a candidate entity identity. In other words, the processor creates a first portion of a the candidate entity identity or digital fingerprint. The processing messages using the processor of the server 152 of system entity 150 to identify is further illustrated in FIG. 6A and further explained below.

The server 152 of the system treats every candidate as having an unknown identity. At this point, in certain embodiments, very few metrics may be known based on message 260. In certain embodiments, the metrics 2060 may include data that includes the candidate's attested identity and attested attributes of the ad viewing device (device type, attached ip address, viewing size, etc.).

Next, in step 411, in one embodiment, the processor of the server of the system entity determines the necessity of a response to the candidate entity's first message based on the processing of the first message received. In one embodiment, the processor of the server of the system may determine that no response is necessary and the process may move to step 495 to produce an output related to confidence of the candidate entity identity based on the first portion of the candidate entity identity. The output may comprise one or more of the following: an indication of the level of confidence of the candidate entity identity, an output metric 2095 associated with the indication of the level of confidence, an output message 295 to be sent to another entity (in step 496) comprising at least one of the indication and the output metric, and an update to the neural network based on the flow of data between entities (e.g., messages, responses, replies). In one embodiment, an indication of the level of confidence of the candidate entity identity may include a statistical probability or other statistical measurement as to if the candidate entity is in fact the entity that it claims to be. In other embodiments, the indication of the level of confidence may include a statistical probability or other statistical measurement as to the identity of the candidate entity. In one embodiment, the output message 295 to be sent (as illustrated by step 490) to another computing device may be generated by the processor of the system entity and may include data associated with at least one of the indication and the output metric. The output message 295 may be transmitted, with the transceiver of the computing device or server 152 of the system entity 150, to another computing device or entity (such as one of the advertisers 140, 141, 142) wanting to know, understand or receive level of confidence of the candidate entity identity. The update to the neural network, by the processor of the server 152 may be instantaneous or may be a process that is continuous as data accumulates. In other words, the processor of the system entity may update the neural network in the connected database based after an accumulation of messages.

Moving back to step 411, in one embodiment, a candidate entity message 260 may have metrics 2060 that when processed by the processor of the system to embeddings that fall within a trustworthy candidate entity cluster (further explained in diagram FIG. 6A) based on the currently known metrics, but not to the desired level of confidence and the process moves to step 420. The system entity's processor of the server may determine that is necessary for the candidate entity to supply additional metrics. In such a case, the system entity's server 152 may generate a response using the processor and send (or not send) a response message 265 via the transceiver of the computing device or server 152 of the system to the server or computing device or server 170 of candidate entity to request (or not request) to supply additional metrics to increase the level of confidence. In other embodiments, the candidate entity may be known to be untrustworthy (as determined by the processor of the system entity) based on the metrics 2060 received and the system may send via the transceiver of the system entity a response suite or response message (or not send a response message) to obtain additional metrics to train the neural network and to further define the untrustworthy entity's identity (further explained in steps 460, 485, 498, and 499). However, it is understood that if the system entity is another entity of the digital advertisement supply chain.

Still discussing step 411, similarly, in other embodiments, the candidate entity may be known to be trustworthy (as determined by the processor of the system entity) or have a predetermined level of confidence based on the metrics 2060 received in message 260, by the transceiver of the system entity, and the system may send to the candidate, via the transceiver of the system entity, a response suite or response message (or not send) to obtain additional metrics to train the neural network and to further define the trustworthy entity's identity and the process also moves to step 420. Once received by the transceiver of the system entity, the processor of the system entity, may use the requested additional metrics to adjust the indication of the level of confidence (which may include trustworthiness) of the candidate entity. In one embodiment, the response may include one of (i) sending, with the transceiver of the system, to the candidate entity a response message 265; (ii) sending, with the transceiver of the system, to the candidate entity after a delay the response message 265; and, (iii) sending, with the transceiver of the system, no message within a first predetermined amount of time. The response to the first message from the candidate entity may be used to either generate (the processor of the system entity) a reply from the candidate entity that includes at least one of (i) a reply message 275 having message metrics 2075 within the predetermined amount of time; and, (ii) no message within the first predetermined amount of time.

Still discussing step 411, in one embodiment, a generated response by the processor of the system computing device or server 152 is based on which currently unknown message metric exhibits instability. A response to a message 260 may comprise sending, with the transceiver of the system entity, a response message 265 to the candidate entity. Additionally, the response to the message 260 received from the candidate entity may include sending, with the transceiver of the system entity, the response message 265 after a delay. Further, the response to the message 260 may comprise sending, with the transceiver of the system entity, no message within a predetermined amount of time. After generating, by the processor of computing device or server 152, the response to the first message 260, then a first reply to the first response may be received with the transceiver of the system. The first reply from the candidate entity may comprise a reply message 275 having reply message metrics 2075 within the predetermined amount of time and/or no message within the predetermined amount of time. Each of these message metrics 2075 is useful in determining confidence of the candidate entity identity. After receiving the reply from the candidate entity identity, the system, via a processor, processes the reply to identify another portion (i.e., a second portion) of the candidate entity identity. A more complete candidate identity is identified by the processor of the computing device 152 of the system 150 using the message metrics of message 260 and the reply message 275. After a more complete candidate identity is identified by the processor of the computing device 152 of the system 150, then the processor may move back to step 495 to produce an output, which may in one embodiment includes step 497 (FIG. 4B) and sending another message 297 to the server 145 of another entity of the digital advertising supply chain. The output message 297 may include similar types of information and data as output message 295. Output message 297 may include an indication of the level of confidence of the more complete candidate entity identify and an output metric 2097.

Figure 8A:
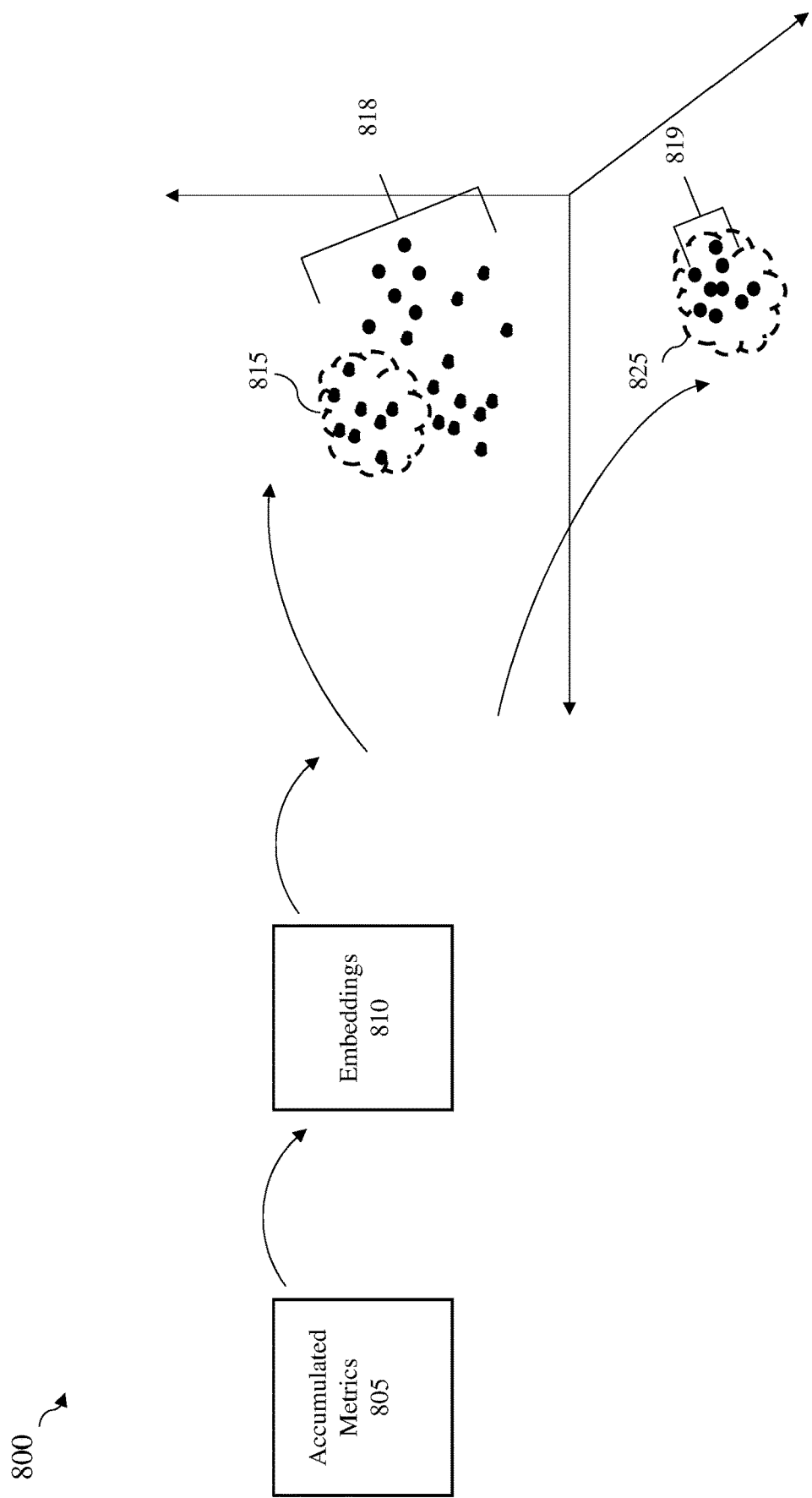
FIG. 8A is a process flow of an embodiment of a method for computing a more complete candidate entity identity, according to an example embodiment.
Figure 8B:
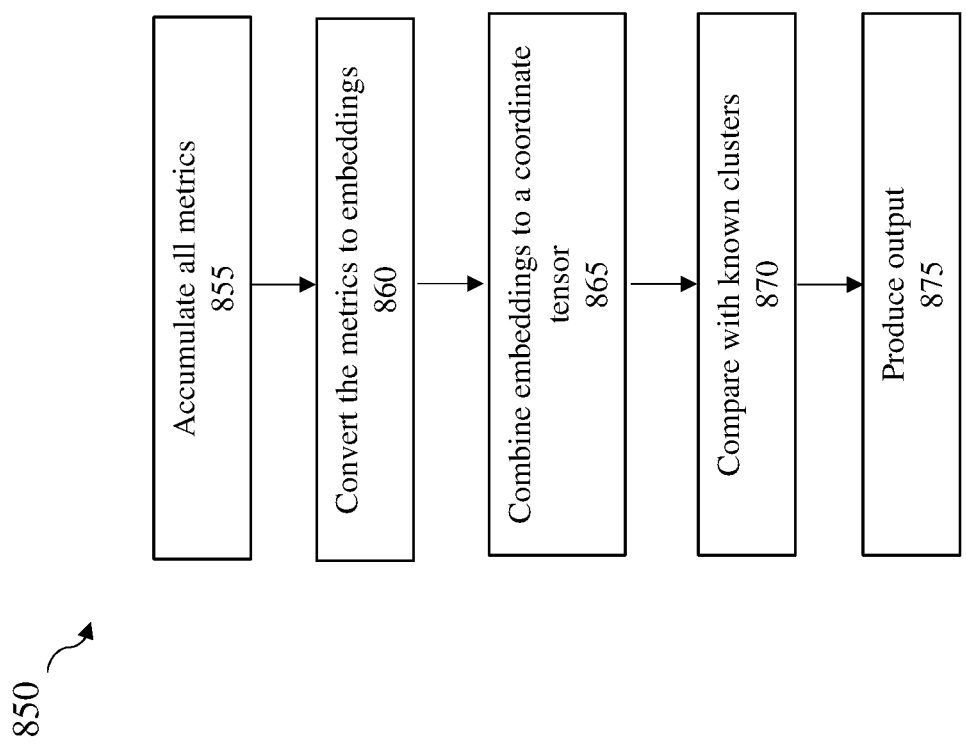
FIG. 8B is a process flow showing an embodiment of a method for producing an indication of confidence of a candidate entity identity; and, FIG. 9 illustrates a computer system according to exemplary embodiments of the present technology.

The candidate entity may be deemed to have a required or predetermined level of confidence and may additionally be classified as trustworthy or not trustworthy by the processor of the server 152 of the system based on the message metrics, which is further explained below and processes of which are illustrated in FIGS. 8A-B. In other terms, a level of confidence as to the identity of the candidate entity may be produced by the processor of the computing device or server 152 of the system. As mentioned throughout, the system entity 150 is (i) not associated with or is disparate from the candidate entity and (ii) may be used in conjunction with, may be separate from, or may be any one of the SSP, DSP, advertiser and publisher. Additionally, the system entity 150 may be a separate entity in the digital advertisement supply chain and not associated with or is disparate from the candidate entity. Regardless, an indication of the trustworthiness of the candidate entity is provided by the processor of the computing device or server 152 of the system entity 150 (in step 495, which is further explained below) in the form of an output related to confidence of the candidate entity identity.

The output may comprise one or more of the following: an indication of the level of confidence of the candidate entity identity, an output metric associated with the indication of the level of confidence, an output message 295 to another entity comprising at least one of the indication and the output metric 2095, and an update to the neural network based on the flow of data between entities (e.g., messages, responses, replies). In one embodiment, an indication of the level of confidence of the candidate entity identity may include a statistical probability or other statistical measurement as to if the candidate entity is in fact the entity that it claims to be. In one embodiment, the output metric associated with the indication of the level of confidence may include raw data and/or segments of code that the indicates level of confidence that the candidate entity identity is a known entity identity. In one embodiment, the output message 295 to be sent (as illustrated by step 496) to another computing device may be generated by the processor of the system entity and may include data associated with at least one of the indication and the output metric. The output message 295 may be transmitted, with the transceiver of the computing device or server 150 of the system entity, to another computing device or entity (such as one of the advertiser 140, 141, 142) wanting to know, understand or receive level of confidence of the candidate entity identity. The update to the neural network, by the processor of the server 152 may be instantaneous or may be a process that is continuous as data accumulates. In other words, the processor of the system entity may update the neural network based after an accumulation of messages.

In one embodiment, if the candidate entity has a predetermined minimum level of confidence and is trustworthy as determined by the processor of the server 152 of the system entity, one or more advertisements will be supplied to the consumer on the consumer's computing device for consumption. If the candidate entity is deemed to not be trustworthy, i.e., a potential fraudulent actor, no such advertisements will be supplied to the consumer's computing device for consumption. If the trustworthiness of the candidate entity cannot be ascertained with high enough confidence based on the first message metrics, or if the process requires (such as to obtain data to update the neural network), then the process moves to step 420.

Figure 7A:
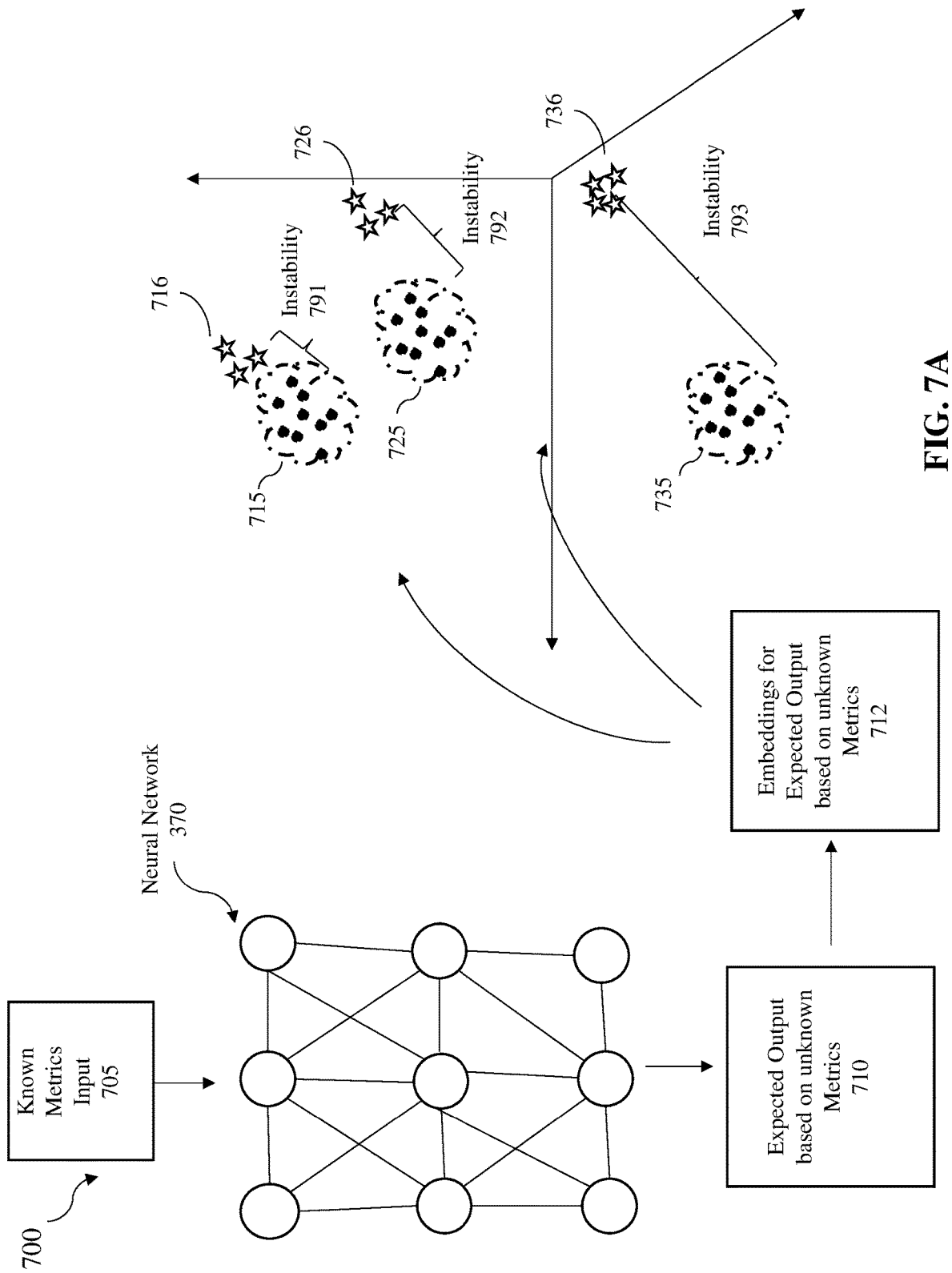
FIG. 7A is a diagram illustrating certain portions of the process flow for selecting a response to an initial or message or reply message from a candidate entity, according to an example embodiment.

In step 420, after the processor of the system entity determines a response is necessary, the processor of the system entity performs experiments using the neural network to determine the instability of the certain metrics currently unknown in the candidate entity messages received. In one embodiment, performing experiments comprises processing with the processor of the server system entity a message from the candidate entity (e.g., the first message, or any subsequent reply messages) using the neural network to determine an expected output from currently unknown metrics of the message received from the candidate entity. As will be discussed in greater detail below and as illustrated in FIG. 7A, performing experiments, with the processor of the system entity, using the neural network can identify the most useful metrics for ascertaining the identity of an entity. Metrics that do not increase the confidence level of the trustworthiness of a candidate entity are not useful and should be avoided. Rather, metrics that have a higher probability of increasing the confidence level of the trustworthiness of a candidate entity should be requested from candidate entities. The term trustworthiness as used throughout the application may mean whether the candidate entity is the entity that the candidate identity is supposed to be.

Figure 7B:
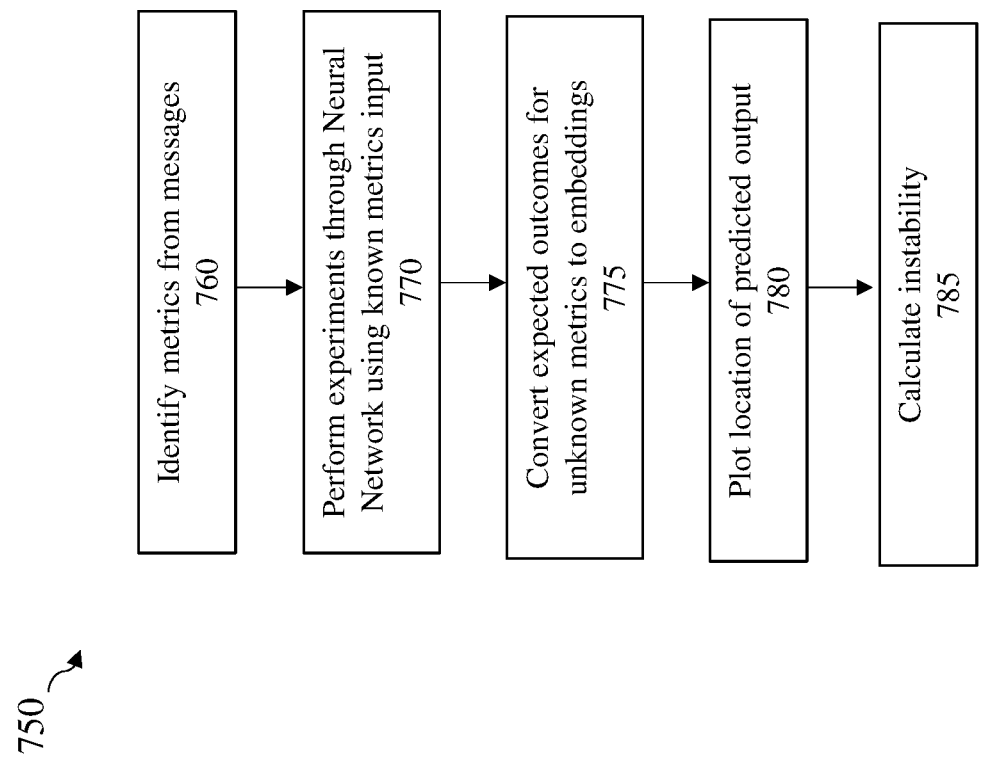
FIG. 7B is a flow chart illustrating certain portions of the process flow for selecting a response to an initial or message or reply message from a candidate entity, according to an example embodiment.

As illustrated in FIGS. 7A and 7B and further explained below, after performing the experiments with the processor of the system entity, the expected output is examined by the processor of the system entity, for at least one of the currently unknown metrics, the expected output 716, 726, 736 is then placed within or relative to candidate entity clusters 715, 725, 735 identified from the message to determine which metrics would exhibit the most instability 791, 792, 793 (further explained below).

Moving back to step 430, in step 430, after performing the experiments (with the processor of the system entity), the instability of the currently unknown metrics is scored or determined by the processor of the server 152 of the system entity. In one embodiment, the scoring by the processor of the system entity comprises examining which of the currently unknown metrics of the message exhibit the most instability based on the processing with the neural network. In one embodiment, instability is a measurement of a propensity to move between candidate clusters with smaller changes to the currently unknown metrics than would have been predicted. However, embodiments and ways for determining instability may be used and are within the spirit and scope of the present invention. The instability can be determined based on a predetermined level of instability, a predefined threshold value, or any suitable measurement. As will be discussed in greater detail below, an example of experimenting by the processor of the system entity using a neural network to determine metrics that induce instability is shown in FIG. 7A and discussed below.

Next, in step 440, after the scoring 430 step, a response suite is then selected by the processor. In one embodiment, the response suite may include a response message 265 include code or data 2065 for requesting one or more unknown metrics from the candidate entity in a response message. In one embodiment, shuffling is performed using a value-weighted shuffle. For instance, given a set of metrics that induce the most instability, that set of metrics is shuffled, and a response suite is then selected from that shuffled set. In one embodiment, the value-weighted shuffle may be performed over a sum of possible requests for the message from the candidate entity. In one embodiment, the value of the value-weighted shuffle is the instability of a dimension over a normalized change in the metric that triggers the instability. However, other shuffling or randomization algorithms and processes may be used and are within the spirt and scope of the present invention. It is also understood that other methods of selecting response suites for responses messages, via randomized selection or otherwise, may also be used and are within the spirit and scope of the present invention. As discussed above, requested metrics should increase the confidence level of the trustworthiness of a candidate entity. One such way is by measuring the instability of the metric and requesting one or more of the most instable metrics from a candidate entity.

After the shuffling, in step 450, response suite for the response message is selected by the processor of the server 152 system entity and the response suite is sent in step 460 via the transceiver of the system entity to the candidate entity the response message. The response suite may include a collection of unknown information to request from the candidate entity. Due to the previously described shuffling, the response suite may comprise a response message 265 that data 2065 requesting metrics about a candidate entity that are known to have a higher instability based on the experiments performed by the processer of the server 152. By sending a response message 265 that requests a reply message 275 with metrics 2075 from a candidate entity that are known to have a higher instability, there may be a higher likelihood of increasing the level of confidence about a candidate entity's identity and in turn trustworthiness. The response suite may also include (ii) sending, with the transceiver, to the candidate entity after a first delay the response message 265; and, (iii) sending, with the transceiver, no message within a first predetermined amount of time. It is understood that sending no response or sending a response message 265 after a delay may cause the system to receive additional metric based on how the candidate entity responds (or does not respond) to the delay of response message 265 within the predetermined amount of time. The certain delay may be an amount of time that may useful in determining the level of confidence of the candidate identity. In other embodiments, the response suite may be to not send to the candidate entity via the transceiver of the system entity any message. The processor of the system entity generates the response suite based on which of the at least one respective currently unknown message metric exhibits a certain instability. In some cases, the processor generates the response suite based on messages that which currently unknown message metric exhibits the most instability.

Next, in step 470, the system may receive via the transceiver of the computing device or server 152 of the system entity, a reply from the candidate entity. The candidate entity's reply may include a reply message 275 that may have message metrics 2075. The reply message may be received within a predetermined amount of time. The predetermined amount of time may be an amount of time that may be useful as identified by the processor and may be part of the response suite for producing the level of confidence. The reply from the candidate entity may also include no message within the predetermined amount of time.

Next, in step 480, the reply message is then processed by the processor of the server 152 of system entity to identify a second portion of the candidate entity identity, such as digital fingerprint. A candidate entity's identity may include one or more embeddings that are converted from each of the message metrics received. These embeddings may be combined, plotted or placed (by the processor of the server 152 of the system entity) to a coordinate tensor for evaluation. Candidate entity identities can be compared, by the processor of the system entity, to known entity clusters (grouped embeddings) of a known entity that the candidate entity is supposed to be associated with to determine the level of confidence of the candidate entity identity and in turn trustworthiness or non-trustworthiness of the candidate entity. Further information regarding candidate entity identities are discussed in greater detail below in relation to FIGS. 6A-8B. In certain embodiments, if no reply message after sending the response message 265 is received via the transceiver of the server 152 of the system, then a certain indication of trustworthiness may be provided and other processes may be used or taken.

In step 480, by the processor of the system entity, by the processor of the system entity, processes reply message to identify a portion or another portion of the candidate entity identity. In one embodiment, clusters are collections of embeddings that are grouped together by a clustering algorithm. Each cluster represents at least a portion of a discovered identity, which may be previously known as legitimate, fraudulent or unknown. Clustering algorithms that may be useful include algorithms for, but are not limited to, K-means clustering, Mean-Shift clustering, Density-Based Spatial Clustering, Gaussian Mixture Models, and Agglomerative Hierarchical Clustering. However, other types of clustering and algorithms for the same may also be used and are withing the spirit and scope of the present invention.

After the identifying step in 480, in step 490, the processor of the system entity, compares candidate entity identity cluster with expected outcome from experiments performed to produce, with the processor, an output related to confidence of the candidate entity identity based on the first portion of the candidate entity identity. Next, in step 495 an output is provided, which (i) an indication of the level of confidence of the candidate entity identify; (ii) an output metric 2095 associated with the indication of the level of confidence (iii) a message 297 to be sent to server 145 of another entity comprising at least one of the indication and the output metric 2097; and, (iv) an update to the neural network based on at least one of the message 260 and the reply message 275. Additionally, the process may move to back to step 411 to determine if an additional response message is necessary. Based on a desired confidence level (e.g., predetermined threshold value), the candidate entity might be identified as belonging to (i) one or more known and trusted entity clusters or not trusted entity clusters. In contrast, the candidate entity might be identified as belonging to one or more known or known untrustworthy entity clusters. In the alternative, the confidence level may not be high enough to make an identification of the candidate entity. In such a case, the process moves to step 420 and steps 411-495 are repeated. Per above, in certain embodiments, advertisements may be pragmatically supplied to consumers if the candidate entity identity has the required level of confidence and is found to be a trustworthy identity; advertisements are not supplied to consumers if the candidate entity identity has the required level of confidence and is found to be not untrustworthy; and, steps 411-490 are repeated if the trustworthiness cannot be determined based on the currently known metrics about the candidate entity. In this regard, the term, "trustworthy" may be defined as a quality assigned to candidate entities that complete credible ad impressions on a user.

As noted above, the systems and methods described herein may also be useful in other digital programmatic systems. Thus, other digital programmatic systems may similarly receive a message having metrics, process the message to identify a first portion of a candidate entity identity and subsequently determine if a response is necessary. In the event a response is necessary, the other digital programmatic systems may perform the steps outlined by 420-495 as illustrated in FIG. 4A.

With reference now to FIGS. 5A-5B, an example of code having metrics 505 received from a candidate entity are shown in FIG. 5A and the corresponding embeddings of the metrics 510 are shown in FIG. 5B. The non-limiting embodiment of code in FIG. 5A is associated with the metrics that is included in or associated with the messages received and transmitted by the transceiver of the system entity. As shown in FIG. 5A, some of the data provided in the example metric 505 is numerical data, whereas the metric, "rtb_json_whitespace_feature_17" is a segment of code indicating properties associated with an ad. Metrics have either a measured value, no value set (but value could have been set under protocol rules) or no value set (and value could not have been set under protocol rules). These measurements are then converted to points in an embedding, with one embedding for each dimension.

Referring to FIG. 5B, embeddings are used in machine learning to convert words to vectors. An abbreviated version of example is listed in FIG. 5B. More particularly, embeddings make it easier to perform machine learning on large inputs in a high-dimensional space, such as words, to convert them into a relatively low-dimensional space. In this way, semantically similar inputs are grouped close together in the embedded space. Thus, embeddings are preferred for the methods described herein. As discussed below, embeddings converted from metrics are used to form a coordinate tensor and subsequently identify a plurality of candidate entity clusters associated with the message(s) received from the candidate entity. During the process, the processor of the system entity's server 152 will identify the plurality of message metrics associated with a message. The processor will convert each of the identified metrics associated with the message to a message embedding. Each embedding represents at least a coordinate in a dimension of a plurality of dimensions.

In one embodiment, the message metrics of the messages are derived from a wire protocol. The wire protocol may be one or more of TLS Cipher Suite Selection, HSTS Preload, TLS version and feature selection, HTTP 1.0, HTTP 2.0, QUIC, timing thresholds, retries, header structure, cookie retention, and cookie storage. In one embodiment, the message metrics are derived from an advertisement markup. The advertisement markup may be one or more of version variance, fault tolerance, wrappers, redirect, VAST sequencing, and HTTP Lib. In one embodiment, the message metrics may be derived from network topology. The network topology may be one or more of DNS timings and DNS caching. In one embodiment, the message metrics are derived from a publisher configuration. The publisher configuration may be one or more of events origin and creative origin. In one embodiment, the message metrics may be derived from exchange dynamics. The exchange dynamics may be one or more of waterfall, mutations, auction effects, trace, and distribution. In one embodiment, the message metrics may be derived from structural characteristics. The structural characteristics may be one or more of textual characteristics and sequence characteristics. In one embodiment, the message metrics may be derived from hot spotting. In one embodiment, there may be a surge in the number of ad requests from a single device (looping hot spotting); there may be a surge in traffic to a publisher; there may be surge in traffic; and there may be sudden changes in geographic, device type, time of day and density of publisher audience (composition). Other message metrics may be derived from cacheable timings, creative attempts, network geography, dimensional tolerations, jitter handling, redirect parameters, transfer sequence parameters, buffering timings, caching parameters, encoding parameters.

As noted above, the systems and methods described herein may also be useful in other digital programmatic systems. Other digital programmatic systems may use any of the wire protocols, advertisement markups, network topology, publisher configuration, exchange dynamics, hot spotting, cacheable timings, creative attempts, network geography, dimensional tolerations, jitter handling, redirect parameters, transfer sequence parameters, buffering timings, caching parameters, encoding parameters. Other digital programmatic systems may also utilize other methods not expressly disclosed herein.

Figure 6A:
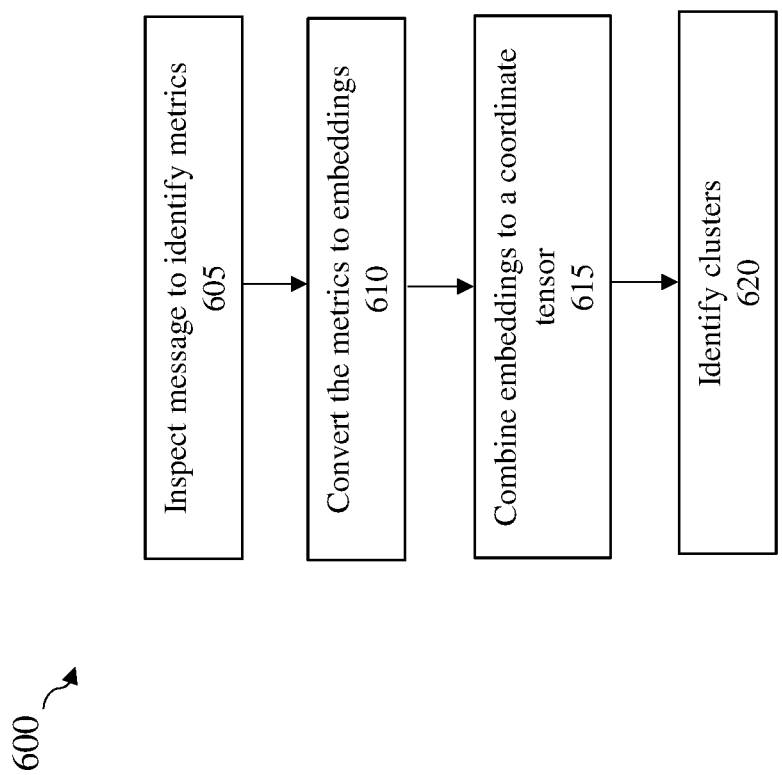
FIG. 6A is a flow diagram of an embodiment of a method for processing message metrics to identify a portion of a candidate entity identity, according to an example embodiment.
Figure 6B:
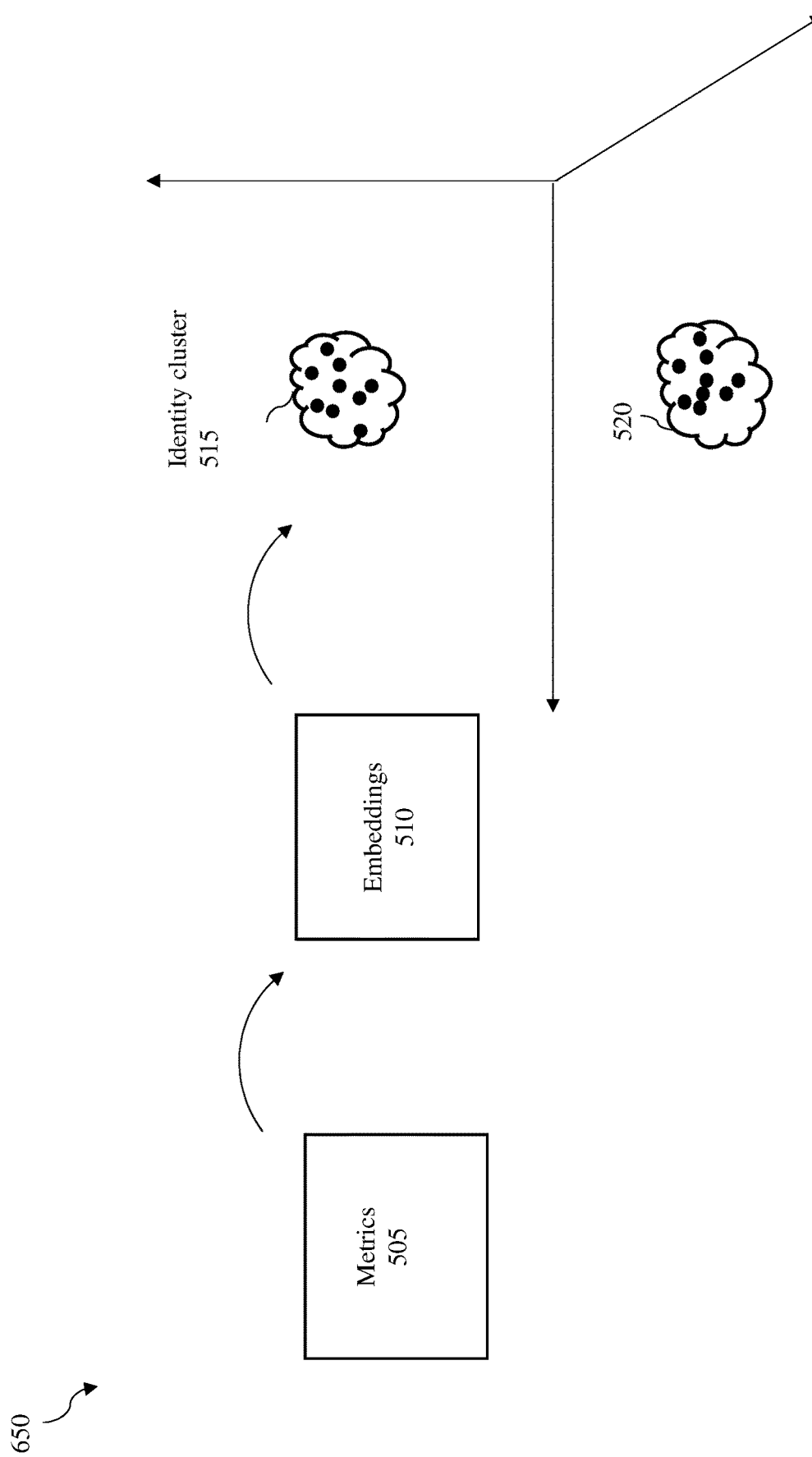
FIG. 6B is a diagram that illustrates certain portions of a process flow for identifying entity clusters from the metrics.

With reference now to FIGS. 6A and 6B, a block flow diagram 600 of an embodiment of a process flow for processing message metrics using the server 152 to identify a portion of a candidate entity identity. A similar process may also be used to identify a portion of a known entity identity. In one embodiment, a first message is processed by the processor of the server system entity's computing device or server 152, to identify all of the first message metrics associated with the first message. This first message may be first message 260. In one embodiment, a message, a reply or a subsequent reply or subsequent message is processed. As illustrated, process includes, in step 605, inspecting, with the processor of the server 152 of the system entity, the message received (e.g., first message, a reply message, or second reply message) to identify the metrics 505 associated with message. Upon receipt of a message from a candidate entity, the server 152, inspects the metrics observable from the message, according to the list of experiments possible under the protocols in use to transmit the message (e.g., TCP, HTTP, RTB, JSON and XML). One skilled in the art would understand how to process the code of the messages received (by the transceiver of the system entity) to identify the message metrics, at this juncture there are very few metrics. As mentioned above, in certain embodiments, essentially all that can be measured is the requestor's attested identity and attested attributes of the ad viewing device (device type, attached IP address, viewing size, etc.).

Next, in step 610, after inspecting the message, with the processor of the system entity, the process includes converting with the server 152 the message metrics to a plurality of embeddings 510, where each embedding represents a coordinate in a single dimension of a plurality of dimensions. All n embeddings are combined into n-dimensional coordinate tensor which may fall within one, several or zero identity clusters. Next, in step 615, after converting the metrics to embeddings 510, the process includes combining, plotting or placing, using the processor of the server 152 of the system entity, the embedding into n-dimensional coordinate tensor which may fall within one, several or zero identity clusters. Next, the method includes identifying, the processor of the server 152 of system entity, on the coordinate tensor none or more candidate entity clusters 515 associated with each message 620. Alternatively, the process may include identifying with server 152 no candidate entity cluster associated with the message embedding. In this regard, the embedding(s) may be defined as zero, one or more clusters. In one embodiment, a plurality of embeddings having one or more similar characteristics may be grouped together to define an entity cluster.

In FIG. 6B, a diagram 650 illustrating certain portions of a process flow 600 for identifying entity clusters from the metrics 505 of messages and data received from the candidate entity is shown and performed by server 152 of the system entity. A similar process may also be used to identify a portion of a known entity identity. As illustrated in the FIG. 6B, each of the metrics 505 are converted to an embeddings 510 which are then plotted by the processor of the server 152 of the system entity. As shown, the diagram 650 in FIG. 6B has candidate entity clusters 515, 520. These clusters may be identified using clustering algorithms that group embeddings together based on their underlying metrics. These clusters (and in certain cases zero or one cluster) may be used for identifying a candidate entity identity. As illustrated, the embeddings within the candidate entity clusters 515, 520 are plotted in a three-dimensional space. However, it is understood that the embeddings may be n-dimensional tensors where n is greater than three. Thus, the embeddings within candidate entity clusters 515, 520 are plotted by the server 152 in this prophetic example in three-dimensional space for non-limiting purposes. It is understood that the training messages previously received may be used to identify clusters or identities may be previously known legitimate actors (trustworthy), fraudulent actors (untrustworthy), and unknown actors.

Similarly, the known entity cluster may be formed from the same or similar process (steps 605-620) of forming portions of the candidate entity identity. The process for forming the known entity cluster includes (i) converting, with the server 152, each message metric received from or associated with known entity, to an embedding; (ii) combining, with the processor of the server 152, each message embedding to a coordinate tensor; and, (iii) identifying, with the processor of the server 152, on the coordinate tensor at least one of (i) at least one known entity cluster associated with each embedding (ii) no known entity cluster with each embedding. In the present embodiment, some of the first candidate identity coordinates appear to be outside the known candidate entity's cluster of identity coordinates. This may assist in providing the indication that candidate entity's identity does not match the identity of the entity that the candidate entity alleges to be.

Referring now to FIGS. 7A and 7B, FIG. 7A is a diagram 700 illustrating process flow 750 in FIG. 7B demonstrating certain portions of the process flow performed by the processor of the server 152 of the system entity for selecting a response to a first message, first reply or second reply from a candidate entity 700 is shown. Message metrics received by the transceiver of the system entity from a candidate entity messages (e.g., first message, first reply message or second reply) have known metrics and also currently unknown metrics. The metrics in these messages may be associated with entity that the candidate entity alleges or claims to be associated with or with its' advertisement supply chain. In other embodiments, the metrics in these messages may be associated an unknown entity or a known fraudulent entity or bad actor.

In step 760, the processer of the server 152 identifies the unknown metrics and known message metrics based on the messages received. The server 152 entity identifies the plurality of message metrics associated with the message metrics where the message metrics includes both currently known and currently unknown message metrics. Stated differently, unknown metrics are message metrics that are not included in the message from the candidate entity but may be known otherwise.

Next, in step 770, the currently known metrics 705 from the messages are processed by the processor of the server 152 of system entity using a neural network 370. As mentioned above, the neural network 370 has been trained on previous encounters with similar known values received from a plurality of entities. In other words, the machine learning model or neural network is trained on the previously received metrics. As discussed above relative to FIG. 4A, in step 420, experiments are performed by the processor of the system entity's server 152 using the neural network to ultimately score which of the currently unknown metrics exhibit the most instability. Referring back to FIGS. 7A-B, in step 770 the known metric 705 input (that were used to create a portion of the candidate entity identity) are processed thought the neural network 370 to create a range of expected output metrics 710 for the unknown metrics. Stated differently, the known metrics of a message (e.g., first message, first reply message or second reply) are processed by the processor of the system entity using the neural network 370 to determine an expected output metric for currently unknown metrics that were not provided in a first message or any reply messages.

Next, in step 775, the expected output metrics 710 processed through the neural network 370 is examined by the processor of the server 152 and may convert the range of expected output metrics 710 for the unknown metrics to embeddings 712. Next in step 780, the expected output embeddings 712 are placed or combined by the server 152 within candidate entity clusters identified from the message. A visual representation of candidate entity clusters 715, 725 and 735 are illustrated with expected outputs 716, 726, 736 derived from the neural network 370 based on the expected output for unknown message metrics 710.

Next in step 785, the system's processor then calculates the instability 791, 792, 793 of each of the metrics. The server may assign an instability value to each of the candidate entity embeddings that are combined on the coordinate tensor. In one embodiment, instability is a measurement of propensity of an embedding to move relative to a candidate entity cluster with smaller changes to metrics than predicted. Stated differently, the greater the propensity of the embeddings (plotted on the coordinate tensor) to move relative to the candidate entity cluster with smaller changes to the unknown metric that predicted, the greater the instability. Conversely, the less the propensity of the embeddings plotted on the coordinate tensor to move relative to the candidate entity cluster with changes to a predicted metric for the unknown metric, the smaller the instability. The most instability may be defined as metrics having have the greatest tendency to move between candidate cluster with smaller changes to a metric than predicted.

By way of example, and as illustrated in FIG. 7A, the first expected outputs 716 for the first candidate entity cluster 715 exhibit a lower instability 791 relative to that of third expected output 736. The third expected outputs 736 for the third candidate entity cluster 735 exhibit a relatively larger instability 793 than of the expected outputs. The second expected outputs 726 for the second candidate entity cluster 725 exhibit an instability 792 in between that of the instability 791 and instability 793. While, only three dimensions are only illustrated, it is also understood that the entity clusters may span n dimensions.

The server 152 takes advantage of protocol of advertisement supply chain vagaries by modifying its response, while staying within both the stated and practical bounds of the protocol, in order to solicit valuable metrics not yet seen for the transaction under scrutiny. This is done with the neural network trained on previous encounters with similar known values, examining the range of expected output for the hitherto unknown metric, placing those expected outputs within the candidate clusters, and examining which metrics exhibit the most instability. In certain embodiments, the utilization of the machine learning model is determined the likelihood of each experiment type to solicit a subsequent metric which eliminates competing candidate identities.

For example in one embodiment, the selected response is DNS caching. DNS caching uses the candidate's computer's operating system (or upstream ISP) DNS cache to flag devices which have previously made requests to server 152 of the system. The system's response may include a response message 265 having metrics or data 2650 that repeats a nonce subdomain used in a previous transaction from another device attached to a different ISP. The expectation is that if the same candidate manufactured two dissimilar requests, the response to the subsequent request could be resolved by the candidate's DNS cache without a subsequent hit to server 152. For example, response message 265 may include segments of code like <Wrapper><VASTAdTagURI><![CDATA[https://re-peated-nonce.pharos.service/ad.xml]]></Wrapper>. In response to message 265, the candidate entity device 170 may cause message 275 to be sent to the service 152. In other embodiments, the response by the candidate entity may include a no response. In message 275 metrics 2750 may be included. The metrics 275 may request the wrapped VAST markup and the metrics 2750 may be recorded, including whether a subsequent DNS request was received for the repeated use of a nonce subdomain. Before message 285 is sent by server 152, the machine learning model is evaluated with the additional metrics received by the responses from the candidate entity device 179 to determine a response by the server. As mentioned above, the response by the server is selected to receive a subsequent metric which eliminates competing candidate identities.

In one embodiment, the next experiment to be performed may be TLS cipher selection. TLS cipher selection again uses the candidate's operating system or the ad player's TLS library, to negotiate TLS cipher for the connection. By varying the TLS cipher suite offered, server 152 can solicit different TLS cipher suite negotiation from the candidate depending on the candidate's capabilities and preferences. The candidate's TLS cipher selected is a new metric. Additionally, the TLS version and the time to begin sending the remainder of the request are new metrics.

In one embodiment, server 152, generates a response to the response from the candidate mentioned above. The experiment selection step is repeated with newly obtained metrics. Several experiments are available for this round of communication. The experiments may include count of impression events, and broken media url behavior. Count of impression events solicits responses which attempt to measure the maximum number of VAST impression events the player is willing to connect to. Broken media url behavior solicits responses which attempt to measure how the ad player handles multiple media URLS where the first chosen url does not connect, but a second URL does connect. The VAST response may include several, and in some cases, 9 impression events and two media URLS. Notably, the behavior of the responses, such as in the two media URLS is not predetermined. In the case the of broken media URLS experiment, the system may selectively interrupt the connection of either, typically whichever first selected.

In certain embodiments, the server 152 may observe in a message a request from the candidate to lodge a first impression event. However, media URL request has been made. This was an unexpected response (less than most likely). In such a response, the arrival of an impression request before a media URL is accessed is a new metric. The experiment selection step is repeated (as explained above). This time, several candidate experiments may be skipped because they involve a response which is ineligible at this stage of the ad protocol. In certain embodiments, the selected experiment by server 152 is event response delay. Response delay intentionally delays transmission of the body of the HTTPS response, while keeping the connection open. Response delay solicits metrics on whether the candidate will timeout the connection, whether the candidate will retry original timed-out connection, whether the candidate will proceed with other VAST events in concurrently while the instant connection is open, whether the a delay in the instant connection will delay start of other VAST event connections, and whether the delay influences the timing of other types of VAST events in the same markup (contained in step 4) where the artificially induced collides with the timing for the next set of events.

In one embodiment, the server 152 observes a request from the ad player or candidate entity to lodge a second impression event, which arrives while the response is ongoing. The fact the arrival is concurrent, and the timing between the first and second request are new metrics. The experiment selection step is repeated. Of the possible experiments, no experiment is selected. A normal response is sent.

In another embodiment, the system 152 observes a request from the ad player or candidate entity to load a third impression event. The fact of arrival, and the timing of the arrival are new metrics. The experiment selection step is repeated. In one embodiment, redirect depth is selected as a response to a response received from the candidate. Redirect depth is similar to response delay, but measures the number of HTTP 30× redirects the player will follow (with or without duration limit). A redirect response may be sent to the candidate entity.

In one embodiment, the server 152, observes several subsequent responses corresponding to the remainder of the requests prescribed in the original ad markup. After receiving several responses, the server 152 may have eliminated many candidates to a high probability, and all responses received after that determination have not materially decreased the confidence in the candidate identity. All responses to subsequent requests are sent with experiments at random, or no experiment at all, in effort to conceal from a sophisticated candidate so that the server 152 may preserve the largest possible pool of candidate experiments. Additionally, new experiment types are added frequently, as changes in the ad protocols allow, existing experiments are refined, or new experiment ideas are discovered and their efficacy tested.

With reference now to FIGS. 8A and 8B illustrating portions of a processes 800 and illustration 850 for computing by the processor of the server 152 of system entity a more complete candidate entity identity (e.g., digital fingerprint) of a candidate entity. The candidate entity identity may be plotted on a numerical tensor where each dimension is a measurement taken from available experiments for the protocol in use by the transaction undergoing identification. To this, first in step 855, the processor of the server 152, accumulated metrics from one or more of first message metrics and reply message metrics to a plurality of accumulated metrics 805. This accumulation may occur over time and from a plurality of candidate entity messages and candidate entity responses.

In step 860, server 152, converts the accumulated metrics to embeddings 810. Next, in step 865, the server 152, combines the embeddings 810 for each of the message metrics to a coordinate tensor as illustrated in FIG. 8A. The groups of embeddings may from no cluster and at least one candidate entity cluster. FIG. 8A shows candidate entity embeddings 818 and 819 forming either no candidate entity cluster or at least one candidate entity cluster. Embeddings of the more complete candidate entity identity can then be compared to the cluster identities of known entities, trustworthy, untrustworthy or any combination or any variation along the trustworthy to not trustworthy spectrum. In one embodiment, FIG. 8A shows a plurality of first candidate entity embeddings 818 plotted on the coordinate tensor relative to a known entity cluster 815 and a plurality of second candidate entity embeddings 819 plotted relative to a known entity cluster 825.

A known entity cluster (grouped embeddings) of a known entity may be the known entity identity that the candidate entity is supposed to be associated. As mentioned above, the known entity cluster of a known entity of the advertisement supply chain may be formed from the same or similar process (steps 605-620) of forming portions of the candidate entity identity. The process for forming the known entity cluster includes: (i) converting, with the server 152, each message metric received from or associated with known entity, to an embedding; (ii) combining, with the processor of the server 152, each message embedding to a coordinate tensor; and, (iii) identifying, with the processor of the server 152, on the coordinate tensor at least one of (i) at least one known entity cluster associated with each embedding (ii) no known entity cluster with each embedding. In the present embodiment in FIG. 8A, some of the first candidate identity coordinates appear to be outside the known candidate entity's cluster of identity coordinates. This may assist in providing the indication that candidate entity's identity does not match the identity of the entity that the candidate entity alleges to be.

By way of another example, as in FIG. 8A where plurality of first candidate entity embeddings 818 are plotted or positioned outside of the known entity cluster 815, the processor may be determine an output having an indication with a low level of confidence that the candidate entity identity is a known entity. On the hand, as in FIG. 8A where plurality of second candidate entity embeddings 819 are plotted inside of the known entity cluster 825, the processor may be determine an output having an indication with a high level of confidence that the candidate entity identity is a known entity. The output related to confidence of the candidate entity identity is based on the first portion of the candidate entity identity relative a known identity. While FIG. 8A illustrates two candidate entity identities plotted on the same coordinate tensor, it is understood that each candidate entity identity may be plotted on different coordinate tensors. Additionally, while each of the candidate entity embeddings is plotted on the same coordinate tensor as the known candidate entity identity it is understood that the candidate entity embeddings may be plotted on different coordinate tensor as the known candidate entity identity.

In this way, the methods described herein can serve to identify multiple identities originating from the various entities in the digital advertisement supply chain. In one embodiment, a DSP employing the methods described herein may identify a first portion of the candidate entity identity (e.g., fingerprint) belonging to the SSP, a second portion of the candidate entity identity belonging to an advertiser's server, and a third portion of the candidate entity identity belonging to the consumer device. A portion of candidate entity identity may lie within several entity clusters. For example, a partial candidate entity identity may lie immediately within distinct identities A through P in dimensions 1 through 146, where identities A through P are differentiated only in dimensions 147 and higher. While narrowing identity to a dozen or so confident matches is useful (e.g., all candidate identities are deemed "legitimate" and among the legitimate identities is the one targeted; or at a minimum that at least no fraudulent identity was identified), there is ample opportunity to narrow the match to a single identity, which is the "response suite". The individual partial candidate entity identities can be combined to form a more complete candidate entity identity, using the processing described above, and the identities of each entity can be verified as trustworthy (authentic) or untrustworthy (fraudulent). In the event that one of the entities is behaving fraudulently in a digital advertising supply chain, the DSP can refuse to deliver the advertisement content.

The processes of identifying partial candidate entity identities and response suite selection can be repeated several times in the course of a single transaction by server 152. At the end, all metrics obtained through the transaction are accumulated by the server to form a more complete candidate entity identity. For example, if the server 152 determines the candidate entity identity is a member of a single correct entity cluster, then identification is complete with high confidence. If this candidate entity identity is a member of multiple clusters along dimension(s) for which the processor was unable to obtain a distinguishing metric, then identification is narrowed to the candidate list, and with a calculable measure of confidence (i.e., level of confidence) for each candidate identity.

Alternatively, the system may be configured to programmatically produce output, including messages, to be sent to other parties server 145 to evaluate whether to deliver certain advertising content or perform or not perform certain actions. The output may be an alert, such as a message, transmitted to the publisher regarding an untrustworthy entity or the advertiser regarding the untrustworthy entity. The message may include identifying information regarding the untrustworthy entity and/or metrics associated with the untrustworthy entity such that the untrustworthy entity can be easily detected in future transactions. Moreover, in the event that the trustworthiness of one or more entities in a digital advertisement supply chain cannot be verified, the DSP can preferentially serve ads through trusted entities.

Additionally, as can be appreciated by one skilled in the art, the methods described herein can be utilized for verifying identities of participants of supply chains other than for digital advertising. Any suitable supply chain comprising a system of organizations of participants and/or individual participants involved in supplying a product or service to a consumer can implement the methods described herein.

With reference now to FIG. 8B, a block flow diagram of a method for producing, by the server 152 of the system, an output related to confidence of the candidate entity identity based on the first portion of the candidate entity identity. As illustrated, the method comprises in step 855, accumulating metrics from a candidate entity. In one embodiment from one or more messages and and/or from one or more reply messages may be used for accumulating the metrics of the candidate entity. Multiple response messages may be sent to candidate entities. In one embodiment, the method may comprise sending a first response message to a candidate entity, receiving a first reply message from the candidate entity, then sending a second response message to the candidate entity, and so on and so forth. Multiple response messages may be needed to identify one or more portions of the candidate entity identity to a certain level of confidence. It is understood that the certain level or predefined level of confidence may be based on a predetermined minimum level of confidence.

With continued reference to FIG. 8B, the method further comprises, in step 860, the server 152 converting the metrics to embeddings and to move to step 865, to combine the embeddings to a coordinate tensor. In other words, the method may comprise processing all or a significant number of message metrics to be plotted on the coordinate tensors. The candidate entity identity may be defined include zero, one or more candidate entity clusters.

Next, in step 870, the server 152, compares the candidate entity identity cluster(s) defined by the coordinate tensors with known clusters.

After, comparison step, in step 875, the server 152 produces an output. The output may include (i) an indication of the level of confidence of the candidate entity identify; (ii) an output metric associated with the indication of the level of confidence; (iii) a message to another entity in the advertisement supply chain interested in the confidence of the candidate entity identify, wherein the message includes at least one of the indication and the output metric; and, (iv) an update to the neural network based on at least one of the first message and the first reply. The output may include an indication of confidence or level of confidence of the candidate entity identity and trustworthiness or non-trustworthiness of the candidate entity. In one embodiment, the indication comprises at least one of (i) the more complete candidate entity identity (e.g., digital fingerprint) for the candidate entity, (ii) a comparison of the more complete candidate entity identity for the candidate entity versus an authenticated candidate entity identity, and (iii) a confidence level of the trustworthiness of the candidate entity.

As noted above, the systems and methods described herein may also be useful in other digital programmatic systems. Thus, other digital programmatic systems may similarly inspect one or more messages to identify metrics, convert the metrics to embeddings (if applicable), combine the embeddings to a coordinate tensor, and identify entity clusters. Digital programmatic systems that do not rely on high dimensional space metrics (e.g., metrics having natural language data) may not require such transformation to embeddings but are still applicable to the methods described herein. In such cases, the metrics may be directly converted to a tensor and the steps described above in relation to FIGS. 7-8B. may be employed on the metric-derived tensor or embedding-derived tensor, as applicable.

In another aspect of the present invention, the methods described above for determining provenance and identity of digital advertising requests solicited by publishers and intermediaries representing publishers may be used to train the neural networks that process metrics. A reply from the candidate having the unknown metrics can then be used to train and improve the neural network itself. For example, in one embodiment a computer implemented method for determining provenance and identity of digital advertising requests solicited by publishers and intermediaries representing publishers comprises sending, via the transceiver of the server 152 of the system entity, to a candidate entity known to not be trustworthy, known to be not trustworthy, or having a predetermined minimum of satisfactory level of confidence, a exploratory response message or to gain additional metrics.

For example, referring back to FIG. 4B, the processer of the server 152 may have produced an output and sent an output message (295, 297) that includes at least the indication of the level of confidence of the candidate entity identify or an output metric (2095, 2097) associated with the indication of the level of confidence of the candidate entity. In this embodiment, the processor of the server 152 may have processed the message 260 and also the reply message 275 (according to steps 405-495) and determined that the candidate entity identity exhibits a predetermined level of confidence that allows the system to sufficiently identify the candidate entity identity as a known entity identity (either trustworthy or not trustworthy). Next, the processor of the server 152 may send (in steps 460, 485), via the transceiver of the system entity, response messages 265 and 285, each have respective data 2065, 2085 requesting currently unknown metrics. These response messages may be used to obtain additional metrics that may be used to update the neural network and as a result may be termed as "exploratory messages." After sending the exploratory messages/response messages 265 and 285 (via the transceiver of the server) to the candidate entity (having the required level of confidence), the server 152, in steps 470 and 498, will receive from the candidate entity computing device or server 170 a reply, which may include a reply message (275, 290) (or no message) having reply message metrics (2075, 2090) from the candidate entity. The system may then use the server and process the replies (including output messages 275 and 295) according to the messages described herein. Based on said processing the system, using the server, may then adjusting the neural network in the connected database 154 based on the candidate entity (having the required level of confidence) responses. These replies (which may include message metrics) received from the candidate entity having the required level or predetermined minimum level of confidence allow the server to update the neural network based on the additional information received. Stated differently the output produced by the system may include updating, with the processor, the neural network based on receiving an accumulation of said second replies. Additionally, in step 499, the server, may transmit an output message 299 with message metrics 2099 to server 145. Output message 299 may also provide an indication of the level of confidence of the more complete candidate entity identify and an output metric 2099 associated with the candidate entity.

It is important to note that some responses to reply messages 260, 275 290 while within the bounds of the allowed protocol, will nevertheless destroy the ad opportunity. For example, intentionally delaying responses until the candidate entity gives up. While the instant ad opportunity is not salvageable in this case, it does provide data that the server 152 may use to make a higher confidence prediction in subsequent iterations, and serves as a honeypot trap for counterparties attempting to assume a legitimate identity but who are not able to mimic every detail of the identity they attempt to hijack.

Figure 9:
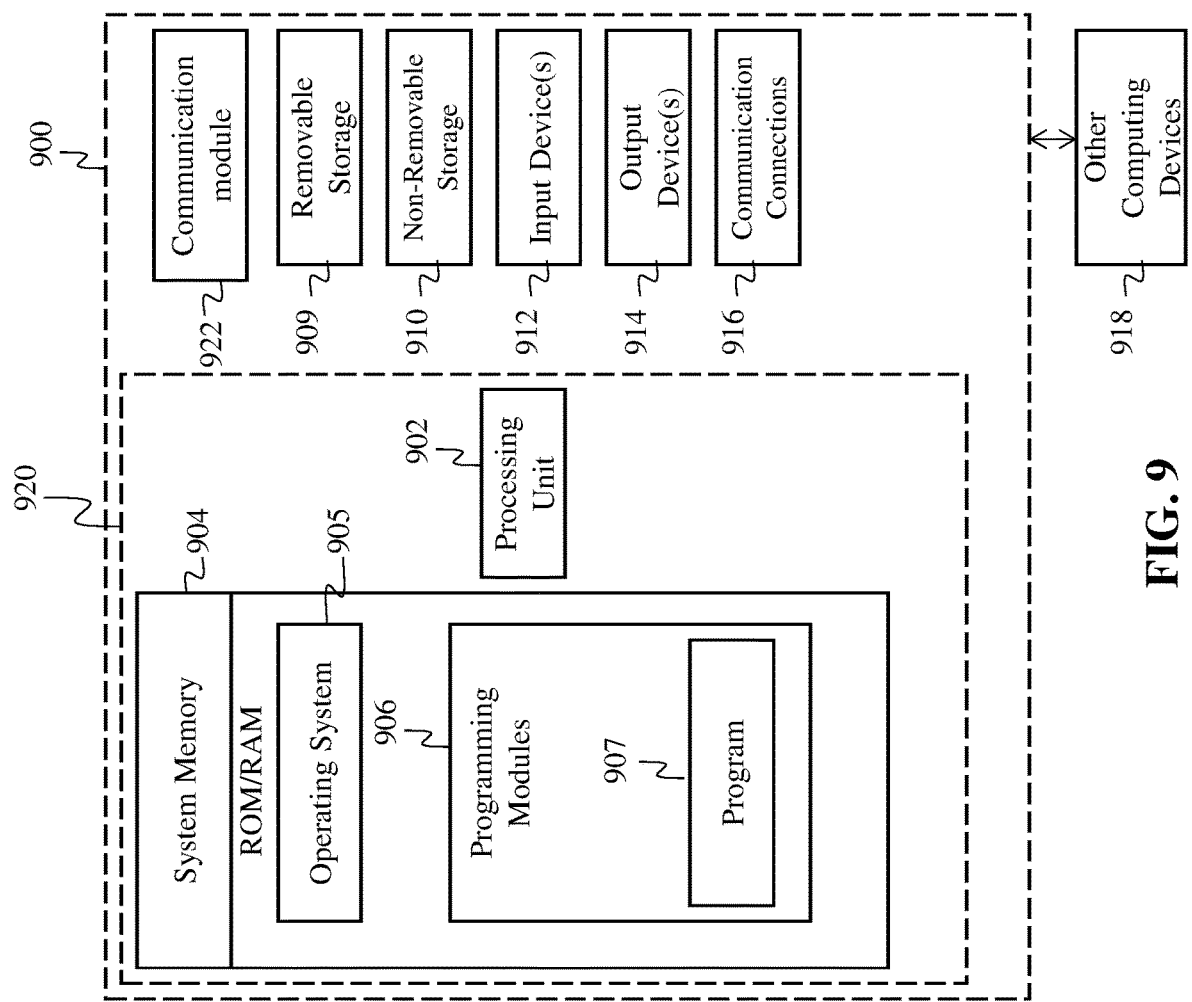

FIG. 9 is a block diagram of a system including an example computing device 900 and other computing devices. Consistent with the embodiments described herein, the aforementioned actions performed by device 105, devices associated with Publisher 110, SSP, 120, DSP 130, advertisers and server 102, 145, 152, 170 may be implemented in a computing device, such as the computing device 900 of FIG. 9. Any suitable combination of hardware, software, or firmware may be used to implement the computing device 900. The aforementioned system, device, and processors are examples and other systems, devices, and processors may comprise the aforementioned computing device. Furthermore, computing device 900 may comprise or be included in the operating environment 100 and processes and dataflow as described above. However, processes described above may operate in other environments and are not limited to computing device 900.

With reference now to FIG. 9, a block diagram of a system including an example computing device 900 and other computing devices is shown. Consistent with the embodiments described herein, the aforementioned actions performed by components of system may be implemented in a computing device, such as the computing device 900 of FIG. 9. Computing device 900 may comprise a transceiver, which can both transmit and receive communications, and a processor configured to process information and instructions. Any suitable combination of hardware, software, or firmware may be used to implement the computing device 900. The aforementioned system, device, and processors are examples and other systems, devices, and processors may comprise the aforementioned computing device. Furthermore, computing device 900 may comprise an operating environment for system. Processes, data related to system may operate in other environments and are not limited to computing device 900.

A system consistent with an embodiment of the invention may include a plurality of computing devices, such as computing device 900. In a basic configuration, computing device 900 may include at least one processing unit 902 and a system memory 904. Depending on the configuration and type of computing device, system memory 904 may comprise, but is not limited to, volatile (e.g. random access memory (RAM)), non-volatile (e.g. read-only memory (ROM)), flash memory, or any combination or memory. System memory 904 may include operating system 905, and one or more programming modules 906. Operating system 905, for example, may be suitable for controlling computing device 900's operation. In one embodiment, programming modules 906 may include, for example, a program module 907 for executing the actions of system for example, and device 105, devices associated with Publisher 110, SSP, 120, DSP 130, advertisers, and server 102, 145, 152, 170. Furthermore, embodiments of the invention may be practiced in conjunction with a graphics library, other operating systems, or any other application program and is not limited to any particular application or system. This basic configuration is illustrated in FIG. 9 by those components within a dashed line 920.

Computing device 900 may have additional features or functionality. For example, computing device 900 may also include additional data storage devices (removable and/or non-removable) such as, for example, magnetic disks, optical disks, or tape. Such additional storage is illustrated in FIG. 9 by a removable storage 909 and a non-removable storage 910. Computer storage media may include volatile and nonvolatile, removable, and non-removable media implemented in any method or technology for storage of information, such as computer readable instructions, data structures, program modules, or other data. System memory 904, removable storage 909, and non-removable storage 910 are all computer storage media examples (i.e. memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 900. Any such computer storage media may be part of system 900. Computing device 900 may also have input device(s) 912 such as a keyboard, a mouse, a pen, a sound input device, a camera, a touch input device, etc. Output device(s) 914 such as a display, speakers, a printer, etc. may also be included. The aforementioned devices are only examples, and other devices may be added or substituted.

Computing device 900 may also contain a communication connection 916 that may allow system to communicate with other computing devices 918, such as over a network in a distributed computing environment, for example, an intranet or the Internet. Communication connection 916 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both computer storage media and communication media.

The communication module 922 of each of the computing devices (associated with any entity of the supply chain) may further comprise hardware such as antennas, processors, memories, oscillators, or other hardware conventionally included with transceivers, modems, or other communication devices.

As stated above, a number of program modules and data files may be stored in system memory 904, including operating system 905. While executing on processing unit 902, programming modules 906 (e.g. program module 907) may perform processes including, for example, one or more of the stages of a process. The aforementioned processes are examples, and processing unit 902 may perform other processes. The aforementioned processes are examples, and processing unit 902 may perform other processes and may also be configured to provide user interfaces displayed associated with devices explained above. Other programming modules that may be used in accordance with embodiments of the present invention may include electronic mail and contacts applications, word processing applications, spreadsheet applications, database applications, slide presentation applications, drawing or computer-aided application programs, etc.

Generally, consistent with embodiments of the invention, program modules may include routines, programs, components, data structures, and other types of structures that may perform particular tasks or that may implement particular abstract data types. Moreover, embodiments of the invention may be practiced with other computer system configurations, including hand-held devices, multiprocessor systems, microprocessor-based or programmable consumer electronics, minicomputers, mainframe computers, and the like. Embodiments of the invention may also be practiced in distributed computing environments where tasks are performed by remote processing devices that are linked through a communications network. In a distributed computing environment, program modules may be located in both local and remote memory storage devices.

Furthermore, embodiments of the invention may be practiced in an electrical circuit comprising discrete electronic elements, packaged or integrated electronic chips containing logic gates, a circuit utilizing a microprocessor, or on a single chip (such as a System on Chip) containing electronic elements or microprocessors. Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general-purpose computer or in any other circuits or systems.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the invention have been described, other embodiments may exist. Furthermore, although embodiments of the present invention have been described as being associated with data stored in memory and other storage mediums, data can also be stored on or read from other types of computer-readable media, such as secondary storage devices, like hard disks, floppy disks, or a CD-ROM, or other forms of RAM or ROM. Further, the disclosed methods' stages may be modified in any manner, including by reordering stages, and/or inserting or deleting stages, without departing from the invention.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

We claim:

1. A computer implemented method for determining provenance and identity of a programmatic digital advertising request and using machine learning to generate a candidate entity identity from the programmatic digital request for a digital advertisement that is submitted by a candidate entity, wherein the programmatic digital advertisement request is purportedly solicited by one of a publisher and an intermediary representing the publisher that are connected on a digital advertisement supply chain, wherein the candidate entity claims to be one of the publisher and the intermediary representing the publisher, wherein the computer implemented method comprises:

receiving, with a transceiver of a first computing device, a first message from a candidate entity computing device associated with the candidate entity;
wherein the first message comprises the programmatic digital advertising request for the digital advertisement and a plurality of first message metrics;
wherein a first message metric comprises code defining one of (i) a serving constraint for displaying the digital advertisement and (ii) a protocol of the digital advertisement supply chain;
wherein the serving constraint has a serving constraint value and the protocol of the digital advertisement supply chain has a protocol value;
in response to receiving the first message, processing, with a processor of the first computing device, the first message using machine learning to inspect the first message to identify the plurality of first message metrics
converting, with the processor using machine learning, at least one serving constraint value and at least one protocol value to a plurality of first message embeddings;
after converting the plurality of first message metrics to the plurality of first message embeddings, then combining, with the processor, the plurality of first message embeddings to a coordinate tensor;
identifying, with the processor using machine learning, at least one candidate entity cluster associated with the plurality of first message embeddings;
generating, with the processor using machine learning, based on the candidate entity cluster, a first portion of the candidate entity identity;

wherein the first portion of the candidate entity identity is a first digital identity comprising the at least one serving constraint value and the at least one protocol value;

comparing, with the processor, the first digital identity to a publisher identity of a publisher message that is stored in a connected database;

wherein the publisher identity is generated, with the processor, by processing the publisher message in the same manner as the first message;

determining, with the processor, if at least one publisher message metric of a plurality of publisher message metrics of the publisher message is not yet identified in the first message;

generating, with the processor, a first response to the first message, wherein the first response comprises at least one of (i) sending, with the transceiver, to the candidate entity computing device a second message, and (ii) sending, with the transceiver, to the candidate entity computing device, after a first delay, the second message; and wherein the second message comprises soliciting a first reply from the candidate entity to the first response wherein the first reply to the first response comprises a third message comprising the at least one publisher message metric not yet identified in the plurality of first message metrics.

2. The computer implemented method of claim 1 further comprising:

after determining the at least one publisher message metric not yet identified, then processing, with the processor, the first message using machine learning through a neural network by performing experiments on the first message to predict a value; for the at least one publisher message metric not yet identified in the first message, wherein the predicted value comprises one of (i) the serving constraint value and (ii) the protocol value, for the not yet identified in the first message;

then calculating, with the processor, an instability exhibited by the predicted value relative to the first digital identity, wherein the instability is a measurement of rate of change of a predicted message embedding to change relative to a corresponding embedding of the first digital identity;

after generating the first response, then receiving, with the transceiver, from the candidate entity computing device, the first reply to the first response, wherein the first reply comprises the third message comprising a plurality of third message metrics;

wherein a third message metric of the plurality of third message metrics comprises code defining one of (i) a third message serving constraint for displaying the digital advertisement and (ii) a third message protocol of the digital advertisement supply chain; and wherein the third message serving constraint has a third message serving constraint value and the third message protocol of the digital advertisement supply chain has a third message protocol value.

3. The computer implemented method of claim 2, wherein after receiving the first reply, the computer implemented method further comprises:

processing, with the processor, the third message by inspecting the third message using machine learning to identify the plurality of third message metrics;

generating, with the processor, a second portion of the candidate entity identity comprising the identified plurality of third message metrics;

wherein the second portion of the candidate entity identity is a second digital identity comprising at least one third message serving constraint value and at least one third message protocol value;

converting, with the processor, the plurality of third message metrics to a plurality of third message embeddings;

wherein each third message embedding of the plurality of third message embeddings is a third vector;

combining, with the processor, the plurality of third message embeddings to the coordinate tensor;

identifying, with the processor using machine learning, at least one second candidate entity cluster associated with the plurality of third message embeddings, wherein the at least one second candidate entity cluster comprises the second portion of the candidate entity identity;

comparing, with the processor, the first portion of the candidate entity identity and the second portion of the candidate entity identity with the publisher identity;

generating a more complete identity by combining, with the processor using machine learning, the first portion of the candidate entity identity and the second portion of the candidate entity identity; and determining, with the processor, based on the more complete identity, a level of confidence that the candidate entity is one of the publisher and the intermediary representing the publisher.

4. The computer implemented method of claim 3 comprising:

after determining the level of confidence, then updating, with the processor, the neural network using machine learning based on receiving the plurality of third messages.

5. The computer implemented method of claim 4, wherein prior to receiving the first message, the computer implemented method further comprises training the neural network, wherein training the neural network comprises:

receiving, with the transceiver, the plurality of third messages comprising the plurality of third message metrics, wherein each of the plurality of third messages is received from at least one of a plurality of second candidate entity computing devices;

processing, with the processor using machine learning, the plurality of third message metrics to generate the neural network; and storing, in a connected database, the neural network associated with a plurality of candidate entity identities.

6. The computer implemented method of claim 5, wherein the instability further comprises the measurement of change of the message embedding to change relative to a corresponding embedding of the first digital identity based on a change to at least one of a plurality of message metrics.

7. The computer implemented method of claim 1, wherein the plurality of first message metrics comprise at least one of: TLS Cipher Suite Selection; a preload list honored; a TLS version; at least one TLS feature; at least one TLS match expectation; negotiation of at least one of HTTP 1.0, HTTP 2.0, and QUIC; at least one timing threshold; a count of at least one failed retry connection by the candidate entity; an interval at which the candidate entity sends the at least one failed retry connection; header structure; cookie retention; cookie storage; maximum number of cookies permitted; maximum length of cookie permitted; version variance;

payload size; fault tolerance; VAST sequencing; HTTP Lib; at least one Cacheable timing; network geography; jitter handling; redirect parameters; at least one transfer sequence parameter; buffering timing; at least one caching parameter; at least one encoding parameter; at least one DNS timing parameter; at least one DNS caching parameter; at least one event origin parameter; at least one creative origin parameter; at least one waterfall type parameter, at least one mutation; at least one auction effect; at least one trace parameter; at least one distribution parameter; at least one textual characteristic; at least one sequence characteristic; at least one looping characteristic; at least one publisher characteristic; at least one exchange characteristic; and at least one composition characteristic.

8. A computer implemented method for determining provenance and identity of a programmatic digital advertising request using machine learning to generate a candidate entity from the programmatic digital advertising request for a digital advertisement that is submitted by a candidate entity, wherein the programmatic digital advertisement request is purportedly solicited by one of a publisher and an intermediary representing the publisher that are connected on a digital advertising supply chain, wherein the candidate entity claims to be one of the publisher and the intermediary representing the publisher, wherein the computer implemented method comprises:
  receiving, with a transceiver of a first computing device, a plurality of training messages received from a plurality of candidate entity computing devices;
    wherein each training message has a plurality of training message metrics comprising training serving constraints and training protocols;
  processing each training message from the plurality of training messages by converting at least one training serving constraint and at least one training protocol to a plurality of training message embeddings; wherein processing further comprises
    combining, with the processor, the plurality of training message embeddings to a training coordinate tensor;
    identifying, with the processor, a training entity cluster on the training coordinate tensor;
    generating, with the processor using machine learning, based on the training entity cluster, a training entity identity;
  after processing the training message, then generating a machine learning model by training a neural network by storing the training entity identity and the training message on a connected database of the neural network;
  after generating the machine learning model, then receiving, with the transceiver of a first computing device, a first message from a candidate entity computing device associated with the candidate entity;
    wherein the first message comprises the programmatic digital advertising request for the digital advertisement and a plurality of first message metrics;
    wherein a first message metric comprises code defining one of (i) a serving constraint for displaying the digital advertisement and (ii) a protocol of the digital advertisement supply chain;
    wherein the serving constraint has a serving constraint value and the protocol of the digital advertisement supply chain has a protocol value;
  in response to receiving the first message, processing, with a processor of the first computing device, the first message using the machine learning model in the same manner as each of the plurality of training messages, wherein processing the first message comprises;
    generating, using the machine learning model, a first portion of a candidate entity identity; and
    wherein the first portion of the candidate entity identity is a first digital identity comprising at least one serving constraint value and at least one protocol value;
  retrieving, from the connected database, at least one training message of the plurality of training messages that is determined by the machine learning model to be associated one of the publisher and the intermediary representing the publisher that the candidate entity purportedly claims to be;
  comparing, with the processor using the machine learning model, at least one of (i) the first message and (ii) the first portion of the candidate entity identity with at least one of (i) the at least one training message and (ii) the training entity identity generated from the at least one training message;
  determining, with the processor, if at least one training message metric of the plurality of training message metrics is not yet identified in the first message;
  if the at least one training message metric is not yet identified in the first message, then processing, with the processor, the first message using the machine learning model, to predict a value, for the at least one training message metric not yet identified in the first message, wherein the predicted value comprises one of (i) the serving constraint value and (ii) the protocol value, for the not yet identified in the first message;
  calculating, with the processor, an instability exhibited by the predicted value relative to the first digital identity, wherein the instability is a measurement of change of a predicted message embedding to change relative to a corresponding embedding of the first digital identity;
  generating, with the processor, a first response to the first message, wherein the first response comprises at least one of (i) sending, with the transceiver, to the candidate entity computing device a second message, and (ii) sending, with the transceiver, to the candidate entity computing device, after a first delay, the second message; and
    wherein the second message comprises soliciting a first reply from the candidate entity to the first response wherein the first reply to the first response comprises a third message comprising the at least one training message metric that was not yet identified in the plurality of first message metrics and that exhibited an instability.

9. The computer implemented method of claim 8, wherein after generating the first response, the computer implemented method further comprises:
  receiving, with the transceiver, from the candidate entity computing device, the first reply to the first response, wherein the first reply comprises the third message comprising a plurality of third message metrics; and
    wherein a third message metric of the plurality of third message metrics comprises code defining one of (i) a third message serving constraint for displaying the digital advertisement and (ii) a third message protocol of the digital advertisement supply chain; and
    wherein the third message serving constraint has a third message serving constraint value and the third message protocol of the digital advertisement supply chain has a third message protocol value.

10. The method of claim 9, wherein after receiving the first reply the computer implemented method further comprises:
   updating, with the processor, the neural network based on receiving the third message and processing the third message;
   wherein processing the third message comprises:
      processing, with the processor, the third message by inspecting the third message using machine learning to identify the plurality of third message metrics;
      generating, with the processor using the machine learning model, a second portion of the candidate entity identity comprising the identified plurality of third message metrics;
         wherein the second portion of the candidate entity identity is a second digital identity comprising at least one third message serving constraint value and at least one third message protocol value;
      converting, with the processor, the plurality of third message metrics to a plurality of third message embeddings;
      combining, with the processor using machine learning, the plurality of third message embeddings to the coordinate tensor;
      identifying, with the processor using machine learning, at least one second candidate entity cluster associated with the plurality of third message embeddings, wherein the at least one second candidate entity cluster comprises the second portion of the candidate entity identity; and
      comparing, with the processor using machine learning, the first portion of the candidate entity identity and the second portion of the candidate entity identity with the training entity identity generated from the at least one training message;
      generating a more complete identity by combining, with the processor using the machine learning model, the first portion of the candidate entity identity and the second portion of the candidate entity identity; and
      determining, with the processor using the machine learning model, a level of confidence that the candidate entity is one of the publisher and the intermediary representing the publisher.

11. The computer implemented method of claim 9, wherein training the neural network further comprising:
   receiving, with the transceiver, the plurality of third messages comprising the plurality of third message metrics, wherein each of the plurality of third messages is received from at least one of a plurality of second candidate entity computing devices;
   processing, with the processor using machine learning, the plurality of third message metrics in the same manner as the plurality of training messages and the first message to generate, for each third message, a second portion of the candidate entity identity;
   generating a plurality complete candidate entity identity by combining, with the processor using machine learning, the first portion of the candidate entity identity and the second portion of the candidate entity identity;
   storing, in a connected database, the plurality of candidate entity identities.

12. The computer implemented method of claim 8 further comprising:
   determining, with the processor, a level of confidence that the candidate entity is one of the publisher and the intermediary representing the publisher by comparing, using the machine learning model, the first portion of the candidate entity identity to a publisher identity stored on a connected database,
      wherein the publisher identity is at least one of (i) the at least one training message and (ii) the training entity identity generated from the at least one training message, that was verified as trustworthy by the machine learning model to be associated with one of the publisher and the intermediary representing the publisher that the candidate entity purportedly claims to be.

13. The computer implemented method of claim 8, wherein the plurality of first message metrics comprise at least one of: TLS Cipher Suite Selection; a preload list honored; a TLS version; at least one TLS feature; at least one TLS match expectation; negotiation of at least one of HTTP 1.0, HTTP 2.0, and QUIC; at least one timing threshold; a count of at least one failed retry connection by the candidate entity; an interval at which the candidate entity sends the at least one failed retry connection; header structure; cookie retention; cookie storage; maximum number of cookies permitted; maximum length of cookie permitted; version variance; payload size; fault tolerance; VAST sequencing; HTTP Lib; at least one Cacheable timing; network geography; jitter handling; redirect parameters; at least one transfer sequence parameter; buffering timing; at least one caching parameter; at least one encoding parameter; at least one DNS timing parameter; at least one DNS caching parameter; at least one event origin parameter; at least one creative origin parameter; at least one waterfall type parameter, at least one mutation; at least one auction effect; at least one trace parameter; at least one distribution parameter; at least one textual characteristic; at least one sequence characteristic; at least one looping characteristic; at least one publisher characteristic; at least one exchange characteristic; and at least one composition characteristic.

14. A computer implemented method using machine learning for determining provenance and identity of a programmatic digital advertising request and using machine learning to generate a candidate entity identity from the programmatic digital request for a digital advertisement that is submitted by a candidate entity, wherein the programmatic digital advertisement request is purportedly solicited by one of a publisher and an intermediary representing the publisher that are connected on a digital advertisement supply chain, wherein the candidate entity claims to be one of the publisher and the intermediary representing the publisher, wherein the computer implemented method comprises:
   generating, with a processor of a first computing device, a first portion of a candidate entity identity based on at least one candidate entity cluster, wherein generating the portion of the candidate entity identity further comprises:
      receiving, with a transceiver of the first computing device, a first message from a candidate entity computing device associated with the candidate entity, wherein the first message comprises the programmatic digital advertising request for the digital advertisement and a plurality of first message metrics;
         wherein a first message metric comprises code defining one of (i) a serving constraint for displaying the digital advertisement and (ii) a protocol of the digital advertisement supply chain;

converting, with the processor using machine learning, each first message metric of the plurality of first message metrics to at least one message embedding;

after converting the plurality of first message metrics to a plurality of first message embeddings, then combining, with the processor, the plurality of first message embeddings to a coordinate tensor;

identifying, with the processor using machine learning, the at least one candidate entity cluster associated with the plurality of first message embeddings; and after generating the first portion of the candidate entity identity, then generating, with the processor, a first response to the first message, wherein the first response comprises at least one of (i) sending, with the transceiver, to the candidate entity computing device a second message, and (ii) sending, with the transceiver, to the candidate entity computing device, after a first delay, the second message;

wherein the second message comprises soliciting a first reply from the candidate entity to the first response wherein the first reply to the first response comprises a third message comprising the at least one publisher message metric not yet identified in the plurality of first message metrics;

receiving, with the transceiver, from the candidate entity computing device, the first reply to the first response, wherein the first reply comprises the third message comprising the at least one publisher message metric not yet identified in the first message;

processing, with the processor, the third message in the same manner as the first message to generate a second portion of the candidate entity identity; and generating the candidate entity identity by combining, with the processor using machine learning, the first portion of the candidate entity identity and the second portion of the candidate entity identity.

15. The method of claim 14, wherein generating the first response further comprises:

comparing, with the processor, the first message with a publisher message stored in the connected database;

determining, with the processor, if at least one publisher message metric of a plurality of publisher message metrics of the publisher message is not yet identified in the first message;

if the at least one publisher message metric is not yet identified in the first message, then processing, with the processor, the first message using machine learning through a neural network by performing experiments on the first message to predict a value, for the at least one publisher message metric not yet identified in the first message, wherein the predicted value comprises one of (i) the serving constraint value and (ii) the protocol value, for the not yet identified in the first message;

calculating, with the processor, an instability exhibited by the predicted value relative to the first digital identity, wherein the instability is a measurement of change of a predicted message embedding to change relative to a corresponding embedding of the first digital identity; and generating, with the processor, the first response to the first message, based on the message embedding exhibiting the instability.

16. The method of claim 15, wherein the method further comprises, generating, with the processor, a level of confidence that a candidate entity identity is one of the publisher and the intermediary representing the publisher by comparing, using the neural network, the first portion of the candidate entity identity to a publisher identity stored on a connected database;

wherein the publisher identity is an identity of a candidate entity that was verified as trustworthy by the machine learning model to be associated with one of the publisher and the intermediary representing the publisher that the candidate entity purportedly claims to be.

* * * * *